US006587109B1

(12) United States Patent
Rose et al.

(10) Patent No.: US 6,587,109 B1
(45) Date of Patent: Jul. 1, 2003

(54) SYSTEM AND METHOD FOR REAL-TIME SCALABILITY OF 3D GRAPHICS BASED ON INTERNET BANDWIDTH AND CPU SPEED

(75) Inventors: Anthony Rose, Bellevue Hill (AU); David John Pentecost, Kingsford (AU); Andrew Kevin Reid, Glebe (AU)

(73) Assignee: B3D, Inc., Woodland Hills, CA (US)

( * ) Notice: Subject to any disclaimer, the term of this patent is extended or adjusted under 35 U.S.C. 154(b) by 0 days.

(21) Appl. No.: 09/471,211

(22) Filed: Dec. 23, 1999

Related U.S. Application Data

(60) Provisional application No. 60/114,146, filed on Dec. 24, 1998, provisional application No. 60/114,341, filed on Dec. 28, 1998, provisional application No. 60/114,451, filed on Dec. 28, 1998, provisional application No. 60/114,019, filed on Dec. 29, 1998, provisional application No. 60/114,026, filed on Dec. 29, 1998, and provisional application No. 60/137,130, filed on May 28, 1999.

(51) Int. Cl.⁷ .............................................. G06T 13/00
(52) U.S. Cl. ..................................... 345/473; 345/428
(58) Field of Search ................................ 345/473–475, 345/649, 655, 660, 666, 672, 681, 428; 717/116, 162, 163, 165, 169, 172, 175, 178, 118

(56) References Cited

U.S. PATENT DOCUMENTS

| | | | |
|---|---|---|---|
| 5,724,499 A | | 3/1998 | Nishiyama et al. |
| 5,907,704 A | * | 5/1999 | Gudmundson et al. ..... 717/100 |
| 5,953,506 A | * | 9/1999 | Kalra et al. .................. 345/428 |
| 6,018,347 A | | 1/2000 | Willis |
| 6,118,456 A | * | 9/2000 | Cooper ........................ 345/619 |
| 6,124,864 A | * | 9/2000 | Madden et al. .............. 345/420 |
| 6,157,929 A | * | 12/2000 | Zamiska et al. .............. 707/10 |

(List continued on next page.)

OTHER PUBLICATIONS

Arikawa, M. et al., "Dynamic LoD for QoS Management in the Next Generation VRML", Proceedings of the 1996 International Conference on Multimedia Computing and Systems (ICMCS '96), pp 24–27, 1996.*
Certain, A. et al., "Interactive Multiresolution Surface Viewing", Proceedings of the 23rd Annual Conference on Computer Graphics, pp 91–98, 1996.*

(List continued on next page.)

*Primary Examiner*—Ulka J. Chauhan
(74) *Attorney, Agent, or Firm*—Christie, Parker & Hale, LLP

(57) ABSTRACT

A system and method facilitating the production, processing, and Internet distribution of 3D animated movies including 3D multipath movies. A key reduction algorithm reduces the keyframes associated with the 3D movie to facilitate the streaming of the data over the Internet. An animation optimization and texture optimization algorithm allows the system to get statistical information of the portions of the 3D object which are invisible (outside the view frame), and whose animation and texture data may thus be safely removed. If the 3D object is within the view frame, the optimization algorithm gathers information about the distance and size of the 3D object and its associated texture data within the frame. The system and method further allows creation of various versions of the 3D object from a single production process. The various versions are tagged with an identifier identifying the target platforms and media platforms in which they are suitable for display. During playback, the correct version of the 3D object is selected for display based on the detected Internet bandwidth and/or CPU speed. To stream the 3D animation content over the Internet for real-time playback, the present system and method allows the data to be divided into an upfront file and various stream files. The upfront file is downloaded prior to the playback of the movie. The stream files are streamed over the Internet and made available to the 3D engine in time for their use.

22 Claims, 23 Drawing Sheets

U.S. PATENT DOCUMENTS

| | | | | |
|---|---|---|---|---|
| 6,160,907 | A | * | 12/2000 | Robotham et al. ........... 345/419 |
| 6,181,336 | B1 | * | 1/2001 | Chiu et al. .................. 345/736 |
| 6,230,162 | B1 | * | 5/2001 | Kumar et al. ............ 707/104.1 |
| 6,243,706 | B1 | * | 6/2001 | Moreau et al. ................. 707/1 |
| 6,272,650 | B1 | * | 8/2001 | Meyer et al. ............... 380/227 |
| 6,282,549 | B1 | * | 8/2001 | Hoffert et al. ................. 707/1 |
| 6,317,789 | B1 | | 11/2001 | Rakavy et al. |
| 6,330,593 | B1 | | 12/2001 | Roberts et al. |

OTHER PUBLICATIONS

Funkhouser, T. et al., "Adaptive Display Algorithm for Interactive Frame Rates During Visualization of Complex Virtual Environments", Proceedings of the 20th Annual Conference on Computer Graphics, pp 247–254, 1993.*

Lippman, A., "Movie–Maps: An Application of the Optical Videodisc to Computer Graphics", Proceedings of the Seventh Annual Conference on Computer Graphics and Interactive Techniques 1980, pp 32–42.*

Lasseter, J., Principles of Traditional Animation Applied to 3D Computer Animation, Computer Graphics, Jul. 1987, pps. 35–44, vol. 21, No. 4, Pixxar, San Rafael, California.

Parke, F.I., Waters, K., Computer Facial Animation, 1996, pps. 105–147, 187–285, A.K. Peters, Ltd., Wellesley, MA.

U.S. patent application Ser. No. 09/471,208, Rose et al., filed Dec. 23, 1999.

U.S. patent application Ser. No. 09/471,212, Rose et al., filed Dec. 23, 1999.

U.S. patent application Ser. No. 09/471,451, Rose et al., filed Dec. 23, 1999.

U.S. patent application Ser. No. 09/471,453, Rose et al., filed Dec. 23, 1999.

U.S. patent application Ser. No. 09/471,722, Rose et al., filed Dec. 23, 1999.

U.S. patent application Ser. No. 09/471,723, Rose et al., filed Dec. 23, 1999.

M. Dyne, *The Win–Win Strategy Behind Multipath Movies*, Strategies, Feb. 30, 1998, pp. 30–31.

Brilliant Digital Entertainment, *Brilliant™ Digital Entertainment Signs Deal with British Telecom to Become One of the First Content Providers for New Broad–Band Service*, Jul. 23, 1998, 3 pgs.

Brilliant Digital Entertainment, *Digital Hollywood Watch Out! Brilliant™ Digital Entertainment Revolutionizes Cinema Production*, May 28, 1998, 3 pgs.

Intel Inside, *Who is Brilliant Digital*, Legal Information © 1998 Intel Corporation, Oct. 9, 1998, http://www.intel.com/au/eng/developer/dbe_3d/company.htm, 7 pgs.

Brilliant Digital Entertainment, *Brilliant™ Digital Entertainment Breaks Through Barrier with Internet–Ready Digital Projector™ and 3D Streaming Technology*, Aug. 12, 1998, 3 pgs.

Brilliant Digital Entertainment, 1997 Annual Report, Mar. 27, 1998, pp. 1–9.

* cited by examiner

FIG.5

```
SUPERMAN —205
    L MODELS —206
        L ACTORS —208
            L SUPERMAN —210a
                L SUPER.S3D —211c
                L SUPER.3DS —211a
                L SUPER.CDS —211b
                L IMAGE
            L LOIS ———————210b
                L LOIS.S3D
                L LOIS.3DS
                L LOIS.CDS
                L IMAGE
        L SCENES ————————209
            L SCENE 101 —212a
                L 101-1a.S3D —213c
                L 101-1a.3DS —213a
                L 101-1a.CDS —213b
                L 101-1b.S3D
                L 101-1b.3DS
                L 101-1b.CDS
                L 101.MES —214
                L 101.PLS —215
            L SCENE 102 —212b
    L SOUND————————207
```

FIG.11

| FRAME | TIME | WIDE WAVE | THRESHOLD VALUE | |
|---|---|---|---|---|
| | | | ROT. | POS./SCALE |
| 1 | 0.04 | SUPER-HEAD | 0.9 | 0.5 |
| 1 | 0.04 | SUPER-TRUNK | 0.8 | 0.5 |
| 2 | 0.08 | LOIS-HEAD | 0.9 | 0.6 |
| 2 | 0.08 | LOIS-HEAD | ∞ | ∞ |
| 2 | 0.08 | LOIS-LEG-LEFT LOISE-LEG-RIGHT | ∞ | ∞ |

FIG. 15A

TYPE OF BUILD

○ CD ~220
○ INTERNET ~221

BUILD DIRECTORY

[BUILD/SUPER ▼] ~222

SCALABILITY FACTORS

○ SOFTWARE
○ HARDWARE
○ BASE PC ~214b
○ PII/266
○ KATMAI
○ VIDEO ~214a

○ 'G' RATED
○ 'M' RATED
○ 'R' RATED
} ~223

SOUND TRACKS

○ ENGLISH
○ JAPANESE
○ FRENCH

○ GERMAN
○ ITALIAN
○ SPANISH
} ~224

[NEXT]

FIG. 15B

```
SOUND COMPRESSION
  O  VOXWARE  11K  MONO   ⎫
  O  VOXWARE  22K  MONO   ⎬ 225
  O  VOXWARE  22K  STEREO ⎭

GRAPHICS COMPRESSION
  O  JPEG    MEDIUM  ⎫
                     ⎬ 226
  O  JPEG    HIGH    ⎭

SELECT SCENES  [101_1a.S3D  ▼] 227
```

FIG.16A

| NAME | LOCATION | TYPE | VERSION | COMPRESSED SIZE | SIZE | OFFSET |
|---|---|---|---|---|---|---|
| SUPER.S3D | 1 | 7 | 1 | 150K | 200K | 450K |
| SCENE101.S3D | 1 | 7 | 1 | 20K | 30K | 670K |

FIG.16B

| NAME | LOCATION | TYPE | VERSION | SIZE | STREAM NUMBER | STREAM FILE INDEX |
|---|---|---|---|---|---|---|
| SCENE101.S3D_STREAM | 5 | 7 | 1 | 100K | 0 | 0 |
| HELLO.WAV | 5 | 2 | 1 | 300K | 1 | 0 |

FIG.16C

| NAME | LOCATION | TYPE | VERSION | SIZE | START TIME | EXTRA SIZE | EXTRA POS. |
|---|---|---|---|---|---|---|---|
| SCENE101.DAT | 7 | 12 | 1 | 350K | −10 | 50K | 800K |

SYSTEM AND METHOD FOR REAL-TIME SCALABILITY OF 3D GRAPHICS BASED ON INTERNET BANDWIDTH AND CPU SPEED

CROSS-REFERENCE TO RELATED APPLICATION

This patent application claims the benefit of the filing date of U.S. Provisional Patent Application No. 60/114,146, filed Dec. 24, 1998, U.S. Provisional Patent Application No. 60/114,341, filed Dec. 28, 1998, U.S. Provisional Patent Application No. 60/114,451, filed Dec. 28, 1998, U.S. Provisional Patent Application No. 60/114,019, filed Dec. 29, 1998, U.S. Provisional Patent Application No. 60/114,026, filed Dec. 29, 1998, and U.S. Provisional Patent Application No. 60/137,130, filed May 28, 1999, the entire contents of which are hereby expressly incorporated herein by reference.

FIELD OF THE INVENTION

The present invention relates generally to 3D animated content, and more particularly, to a system and method for scaling the quality of the 3D graphics of the animated content based on detected Internet bandwidth and CPU speed of a host computer.

BACKGROUND OF THE INVENTION

With the convergence of various media platforms, it is becoming increasingly common for companies to cash in on a successful product on one platform by developing a version of the product for another platform. For instance, a company with a successful video game may wish to make a three-dimensional (3D) movie featuring the characters used in the video game for distribution as a television series.

Due to the different requirements and incompatible nature of the various delivery platforms, it is usually necessary to completely redo much of the artwork for the new medium. For instance, a 1000-polygon model of a 3D object created for the video game version may not be usable for the television version of the product. One reason for this may be due to incompatible data formats. The 3D model used for the video game version may not be readable by the software used to create and animate a television version.

Redevelopment for the new medium may also be required due to incompatible resolutions. A 1000-polygon model that was developed and optimized for a video game may be unacceptably chunky and low-resolution for its television version.

A third reason for the redevelopment of 3D models and artwork might be incompatible animation. The preset "moves" used for a video game may not be useable for the television version where pre-scripted, fully animated character movement is required.

Redevelopment of 3D models and artwork might also be required due to the incompatibility of the 3D modeling and animation tools used for different media. Although modern computers provide effective tools for producing 3D animated content for various media platforms, the programming, modeling, animation and publishing tools used for PC, Internet and television production are frequently incompatible with each other. Thus, multiple sets of development software packages have to be purchased with the attendant issues of cost and difficulty of converting data between the various platforms.

The combination of problems listed above has meant that in general, it is possible to reuse as little as 10% of the assets of a 3D content when developing a version of that content for a different platform.

Problems also arise when creating animated content for distribution to different target machines within the same medium due to their different performance capabilities. For instance, highest-end PCs are capable of rendering high-quality graphics while lower-end PCs are not be capable of rendering such high graphics quality. Because the target machine on which a 3D content will ultimately be rendered is rarely known, two strategies have been utilized to address this issue. One of the strategies is to build the 3D content to have adequate performance on the lowest-end PC to ensure that the 3D content is capable of being played by all types of PCs. With this strategy, the 3D content will perform well on low-end PCs, but the design of the graphics will not meet the expectations of high-end PC owners.

A second strategy is to build the 3D content to perform adequately on mid- to high-end PCs. In this case, the mid- to high-end PC owners will be satisfied with copious high-quality graphics, but a large fraction of the market with low-end PCs may be unable to play the 3D content.

In addition to the above, the creation of 3D animated content using conventional systems and methods is a painstaking and difficult process. For example, any changes made to a 3D object appearing in one scene of a 3D animated content must be made in all the scenes in which the character appears in order for the change to be reflected in those scenes. Furthermore, because animation data is scene specific, animation data created for one particular scene is not shared among the other scenes. Thus, pieces of animation data created for a first scene must be reiterated and stored for a second scene in order for that data to be used by the second scene.

Furthermore, the streaming of 3D animated content over the Internet using conventional systems and methods for real-time playback is fraught with difficulties. One approach used in the prior art for streaming data over the Internet include unlimited read-ahead methods where data is read ahead of the playback position, and attempt is made to pre-fetch as much data as possible. However, this approach is limited in use for multipath movies that have many plot alternatives, or paths, that are influenced by a user's interaction with the movie. Data for a multipath movie may be pre-fetched only up to the point when a user interaction is required. Data beyond this point may not be pre-fetched because it is not possible to predict what scene will be played next, and thus, what data is going to be required next.

Another approach used in the prior art for streaming Internet data is to use a just-in-time approach where data is received just in time to be played. However, this technique falls victim to the vagaries of the Internet. Data rates available for delivering 3D animated content are often inconsistent in nature. The data rate may average 2 Kbps, but there may be times when data is being received at 3 Kbps or no data is being received at all. The failure of the required data to be arrived in time causes pauses in the playback of the animated content.

Accordingly, there is a need for a 3D animation tool that will allow the creation of 3D animated content for different media without engaging in separate development processes. Such tool should allow 3D models and artwork created for one medium to be reused in a different medium. Such a tool should also allow the creation of scalable content for allowing the display of one type of graphics for one kind of target machine and a different type of graphics for a different kind of target machine.

There is also a need for a 3D animation tool that will facilitate the replacement and modifications of 3D objects, as well as allow the re-use of frequently occurring pieces of animation data among the scenes of a movie. Furthermore, there is a need for a system and method for facilitating the streaming of 3D animated content over the Internet for real-time playback. Such system and method should not only provide a streaming technique for multipath movies, but also provide for animation data reduction techniques for reducing the amount of data to be delivered over the Internet.

SUMMARY OF THE INVENTION

The present invention addresses and alleviates the above-mentioned deficiencies associated with the prior art. More particularly, the present invention facilitates the production, processing, and Internet distribution of 3D animated content.

In accordance with one aspect of the invention, 3D graphics of a 3D animated content is scaled based on the particular target platform playing the 3D animated content. The system and method according to this aspect of the invention includes detecting the CPU power of the target platform, selecting a version of the node tagged with a scalability tag identifying the CPU power, and displaying the selected version of the node on the target platform.

If the 3D animation content is to be distributed over the Internet, the system and method includes detecting a data rate for downloading the 3D animated content and selecting a version of the node based on the detected data rate.

It should be appreciated, therefore, that the present system and method allows the animated content to be displayed at the maximum capacity allowed by the host computer. Unlike in the prior art where one movie displayed with a certain quality in a low-end computer would be displayed with the same quality even at a high end computer, the present system and method provides with various versions of the 3D objects appearing in the movie. The host computer then selects the appropriate objects based on the detected capacity.

BRIEF DESCRIPTION OF THE DRAWINGS

FIG. 5 is a schematic layout diagram of a directory structure of files stored in the multipath movie system of FIG. 1;

FIG. 11 is a schematic layout diagram of a threshold table;

FIGS. 15A–15C are illustrations of graphics user interfaces for specifying a build for a multipath movie;

FIGS. 16A–16C are schematic layout diagrams of a header of an upfront file for streaming a multipath movie over the Internet;

DETAILED DESCRIPTION OF THE INVENTION

In general terms, the present system facilitates the production, processing, and Internet distribution of 3D animated movies and other 3D animated content, including 3D multipath movies. Multipath movies are digitally animated stories with many plot alternatives, or paths, that are influenced by a user's interaction with the movie. The presentation and selection of plots in a multipath movie is well known in the art.

Multipath movies may be distributed via CD-ROM, DVD, and the like. The movies may also be streamed over the Internet or distributed as a television broadcast, satellite broadcast, cable programming, or home video, in a non-interactive format.

According to one embodiment of the present system, a creator of a multipath movie need not engage in a separate production process for each distribution medium identified for the movie. Rather, the present system allows multipath movies intended for different target platforms and audiences to be created through a single production process. When the movie is first created, the user creates multiple versions of 3D objects for different types of machines and audiences, and the runtime engine selects the appropriate version to play based on the target identified.

The system further aids in the production of a multipath movie by maintaining a library of 3D objects ("library objects") with their corresponding geometry information. An object's geometry information is accessed from the library for use in the various scenes of the movie in which the object appears. In this way, only the animation data for the library object need to be defined in the scenes themselves, and the object's geometry information need not be replicated in the scenes.

Library objects further help facilitate the making of updates and changes of a multipath movie. For instance, if the creator of such a movie desires to change the geometry of a particular library object, the entire movie need not be recreated scene-by-scene to reflect the change. Instead, the change is made in a single place, the library, and the change will be manifested in all the scenes in which the object appears.

In addition to the above, the system employs various techniques for effectively distributing multipath movies over the Internet. The system's optimization and key reduction techniques aid in the minimization of streaming animation data. The system further allows scalability of 3D graphics data based on the detected Internet bandwidth and CPU speed of a target platform. The system's preloading, caching, and look-ahead mechanisms of Internet-streamed data further aid in effectively using the Internet to deliver multipath movies.

Figure 1:
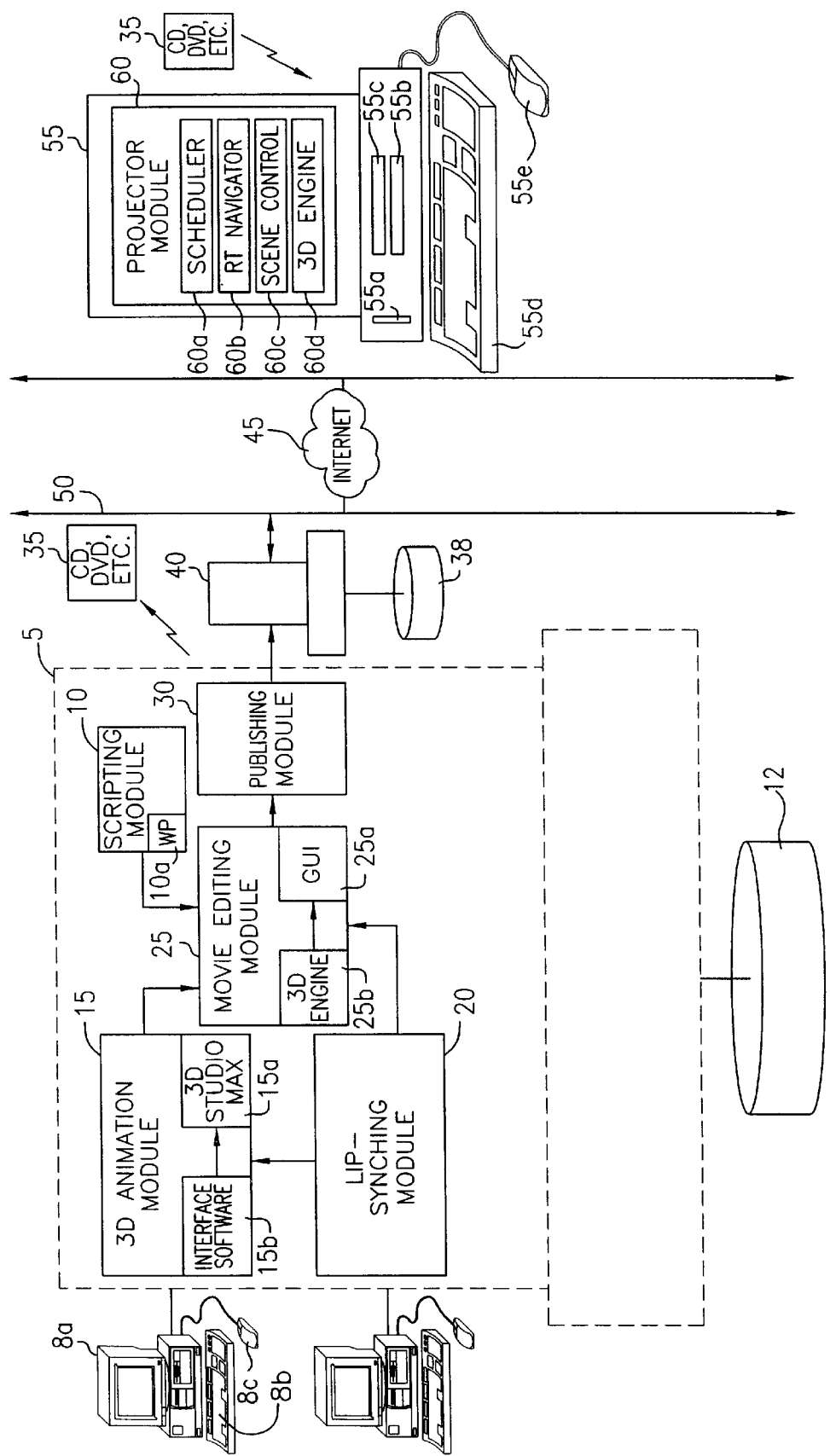
FIG. 1 is a schematic block diagram of an embodiment of a multipath movie system.

Considering the foregoing, FIG. 1 is a schematic block diagram of an embodiment of a multipath movie system. In the embodiment of FIG. 1, a platform computer or server 5 ("server") includes several software modules 10, 15, 20, 25, and 30, that aid an animator in creating a multipath movie.

The animator accesses the server 10 using a personal computer 8 having a display monitor 8a, keyboard 8b, and mouse 8c. The personal computer 8 also includes an Ethernet connection (not shown) allowing communication between the personal computer 8 and the server 5 via a Local Area Network or a Wide Area Network.

The server 5 includes a scripting module 10 for creating scripts for the multipath movie. The scripting module 10 includes a conventional word processing program 10a such as Microsoft Word, which the animator accesses with the personal computer 8 to write a script for the movie. Scripts are written on a scene-by-scene basis.

The server 5 also includes a 3D animation module 15 which allows animators to create 3D animated content based on the script. According to one embodiment of the invention, the animation module 15 incorporates third-party animation and modeling tools 15a, such as 3D Studio MAX, which is commercially available from Autodesk, Inc., of San Rafael, Calif., to aid animators create the animation for the multipath movie. In the following detailed description of the invention, it is assumed that the animation module 15 incorporates 3D Studio MAX as the third party tool 15a.

The animator uses 3D Studio MAX to create scene files with one or more 3D objects. A 3D object includes actors, props, and sets. Actors and props can be animated. Sets are background objects that are not animated.

Actors and props (collectively referred to as actors) are composed of a hierarchy of nodes. The hierarchy begins with a root node and proceeds down to other nodes, each node being associated with a discrete piece of 3D geometry (group of polygons) making up the 3D object. Each node is further identified by a node name. For example, a node representing an object's head might be named a "head" node.

Each node has zero or more parent and child nodes, with the restriction that the linkages cannot form a loop. Thus, a trunk node may have a leg node as one of its children, and a head node as one of its parents.

Each node can also be animated. That is, the node's position, rotation, and scale information can vary over time. According to one embodiment of the invention, a child node inherits the animation associated with its parent nodes. For example, if a node moves 100 units to the left, then all its children nodes also move 100 units to the left.

A node's animation information is stored as one or more keyframes. Each keyframe includes a time value as well as the node's position/scale and rotation values for the indicated time value. The position animation values stored in the keyframes are interpolated to create a position metacurve for the node depicting the node's position animation over time. Similarly, the rotation animation values stored the keyframes are interpolated to create a rotation metacurve depicting the node's rotation animation over time. The different metacurves are combined at run-time to create the final animation.

According to one embodiment of the invention, the animation module 15 provides key reduction techniques for reducing the number of keyframes associated with each animation metacurve, while maintaining an acceptable level of quality in the processed animation. Such key reduction techniques help reduce the size of the scene file, and thus, facilitate the streaming of the animation data over the Internet.

The animation module 15 further allows the storing of the actors of the movie in the system's mass storage device 12 as library model objects. In doing so, the animator uses 3D Studio MAX to create a copy of the actor along with its 3D geometry information from a scene in which the actor appears. The animation module 15 exports the copy of the actor from 3D Studio MAX, and saves it as a master library model file.

According to one embodiment of the invention, the 3D animation module 15 removes an object's geometry information from the scene if the 3D object is a library object, simply leaving the name of the node in the scene, as is described in further detail below. During playback of the scene, the system obtains the removed geometry information from the library file instead of the scene itself. It will be appreciated, therefore, that the geometry information of 3D objects defined as library objects appearing in more than one scene can be updated and replaced by making the change in the library file itself. The animator no longer needs to step scene-by-scene and make individual modifications to each scene in which the object appears.

The animation module 15 also provides an interface software 15b to 3D Studio MAX that allows animators to create various versions of the 3D object for different target platforms and audiences from a single production process. For instance, higher resolution objects are created for movies intended for high-end computers, and lower resolution objects are created for movies intended for low-end computers. The interface software 15b further allows animators to specify whether the movie is to be played on video or computer, and the type of audience that is to view the movie.

The server 5 further provides a lip-synching module 20 for aiding in the production of audio data and corresponding mouth animations for the actors in the movie. The lip-synching module allows the animator to create the audio data and store it in the mass storage device 12 as a conventional audio file (e.g. a ".wav" file).

The lip synching module further allows the animator to use 3D studio MAX to create mouth shape animations for each actor where the animations correspond to selected phonemes. The system invokes any of the lip-synching algorithms known in the art to synchronize an actor's audio file with the appropriate mouth shapes created for the actor. The synchronical mouth movements are stored separate lip-synch file with a ".sync" extension.

In addition to the above, the server 5 includes a movie editing module 25 for editing the multipath movie based on the script created. The editing module 25 provides a graphics user interface 25a that allows the animator to add a list of runtime messages for each scene created with the animation module 15. Such runtime messages include instructions to load a particular scene, define camera movements for the loaded scene, add gestures to the actors in the scene, add a branching point to the scene, etc.

The runtime messages for a particular scene are stored in a separate message file associated with the scene. The messages appear in the message file in the order in which the messages are invoked, along with the exact time for invoking each message.

In addition to a message file, the movie editing module 25 also creates a preload file for each of the scenes. A scene's preload file includes a list of all the files needed for running the scene. Such files include animation files created for the scene, master library model files of actors appearing in the scene, texture files, audio files, lip-synch files, and the like. The file names appear in the preload file in the order in which the files are to be used, along with the exact time for invoking each file.

The movie editing module 25 also performs optimization of animation data to reduce the amount of animation keyframes created for the movie. The movie editing module 25 incorporates a 3D engine 25b that plays the movie from beginning to end. During the playback of the movie, the movie editing module 25 maintains a separate statistics file indicating the times in which a node is outside the view frame, and the maximum magnification of each texture appearing in the movie. The movie editing module 25 performs animation optimization and texture optimization based on the data collected, as is described in further detail below.

A publishing module 30 takes the files created for a particular multipath movie, and builds (i.e. packages) them for distribution on a particular medium. Such media include CD, DVD, Internet, video, and any other medium capable of delivering 3D animated content.

The publishing module 30 packages the files into a single build file or into multiple build files. Single file builds are generally done for non-Internet distributions, such as CD distributions, DVD distributions, video distributions, and the like. In doing a single file build (CD build), all the files necessary for the playing of a multipath movie are packed into the single build file. The single build file may then be stored into a CD, DVD, and the like 35.

For a multiple file build (Internet build), the publishing module 30 divides the files used in the movie into one upfront file and one or more streaming files. According to one embodiment of the invention, the upfront file includes master library model files, texture files, and the like, which are downloaded prior to the playing of the movie. Streaming files include animation and audio files that are streamed over the Internet 45 during the playing of the movie.

The upfront and streaming files are stored in a second mass storage device 38 within a second platform computer or server ("second server") 40 for being delivered over the Internet to a host computer 55.

The host computer 55 is equipped with a modem 55a, CD-ROM 55b, and/or DVD drive 55c. The host computer also includes a conventional keyboard 55d and mouse 55e. A user of the host computer 55 accesses the second server 40 for viewing the multipath movie, over the Internet. The host computer 55 further includes a projector module 60 which allows the playing of the multipath movie. If the movie is distributed over the Internet 45, the host computer 55 downloads the projector module 60 and the upfront and streaming files from the second mass storage device 38 hosted by the second server 40 via the Internet connection 50. The upfront and streaming files include the data necessary for playing the movie. The Internet connection comprises conventional telephone lines, ISDN lines, ADSL lines, DSL lines, cable connection, satellite connection, and the like. If the movie is distributed via a CD or DVD 35, the projector module 60 is downloaded from the CD or DVD 35 using a CD-ROM drive 55b or DVD drive 55c. All the files necessary for playing the movie are also accessed from the CD or DVD 35.

According to one embodiment of the invention, the projector module 60 includes a scheduler submodule 60a, a run-time navigator submodule 60b, a scene control submodule 60c, and a 3D engine 60d. The scheduler submodule 60a processes and/or routes messages in each scene's message file at the designated times. The run-time navigator submodule 60b controls what scene is to be played next. The scene to be played next is based on the plot alternative selected by the viewer of the multipath movie according to conventional methods.

The scene control submodule 60c controls the actual loading and branching of scenes. In doing so, the scene control submodule 60c queries the run-time navigator submodule 60b for the scene which is to be played next, and makes a call to the scheduler 60a with the appropriate message file to load for that scene.

The 3D engine 60d plays a scene which has been loaded by the scheduler 60a in a conventional manner. In playing the scene, the 3D engine 25b presents frames to the viewer at a set rate (e.g. 25 frames per second). In rendering each frame, the 3D engine draws the polygons associated with each of the nodes of a 3D object, and overlays textures (bitmaps) onto those polygons to give them a more realistic look.

Figure 2:
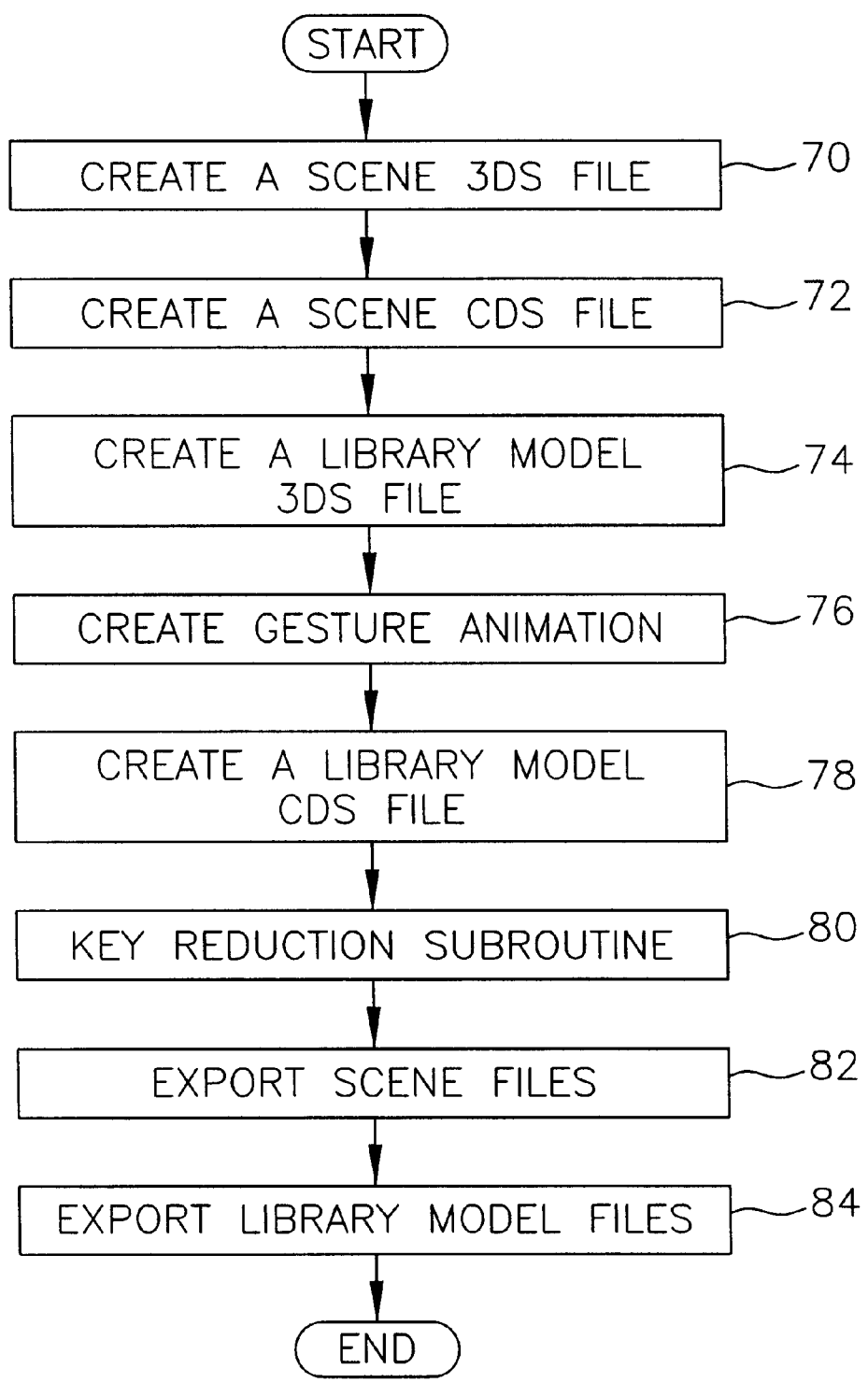
FIG. 2 is a flow diagram of an exemplary process for creating 3D content scenes and library object models for a multipath movie.

FIG. 2 is a flow diagram of the steps undertaken by an animator via the animation module 15 for creating scenes and library object models. In step 70, the animator invokes 3D Studio MAX to create animation for a scene. As described above, a scene includes a hierarchy of nodes for each object appearing in the scene. Each node is associated with 3D geometry data as well as animation data. The animation data is stored in a series of keyframes. The geometry data may or may not be kept in the scene during exporting of the same based on whether the object is a library object. Once created, the animation module 15 stores each scene in a scene file with a "3DS" extension (e.g. "101.3DS").

According to one embodiment of the invention, each node of a 3D object may be associated with multiple sets of 3D geometry data with varying resolutions. For instance, the animator may create a leg node with an average number of polygons for playing in an average-speed machine. The animator may also create another leg node with a higher polygon face-count and mark it as an alternate version of the original leg node, if the actor's leg is to have a high-resolution equivalent for faster machines.

In step 72, the animator creates a companion file to the scene 3DS file created in step 70. The companion file identifies all the library objects in the scene, and further specifies what their root nodes are. This information is used to remove the geometry information of library objects from the scene during exporting of the scene file. The animation module 15 stores the companion file with a "CDS" extension (e.g. "101.cds"). A separate CDS file may not be necessary, however, if the third party tool used to create a scene file allows the animator to specify information about the scene which is now included into the CDS files.

In step 74, the animator uses 3D Studio MAX to create a separate file for each library object in the scene. According to one embodiment of the invention, the animator creates a copy of a scene 3DS file in which library object appears, and deletes all geometry and animation data which is not part of the library object. The animator further deletes all keyframes associated the library object except for frame zero, where the library object appears at a default, resting position. The animator stores each library object file with a "3DS" extension (e.g. "Popeye.3DS").

In step 76, the animator uses 3D Studio MAX to create gesture animations for each library object. A gesture animation is a short animation sequence which is created and stored apart from a scene animation. Generally, gestures are animation sequences that a 3D object performs frequently, and which are relatively independent of the environment. According to one embodiment of the invention, lip movements used for lip-synching are defined as gestures. Other gestures include smiling, laughing, frowning, forward head movement, backward head movement, and the like. Gesture animations are stored in the library object's 3DS file as one or more keyframes.

In step 76, the animator creates a companion file to the library object's 3DS file. The companion file includes additional data about the library object, such as the library object's proper name (e.g. "Popeye") and its root node (e.g. "root: pe_ab_00"). The file further lists the name of all the gesture animations available for the library object. The gesture animations are organized based on animation channels. Lip-sync, emotion, and head-movement are exemplary animation channels.

Each animation channel includes particular gestures applicable to that animation channel. The gestures are defined by a gesture tag including the gesture name and one or more keyframe numbers associated with the particular gesture animation. For instance, an emotion channel might include the following list of gesture names and keyframe numbers: "sad 10–11, happy 12–13, laughing 14–16" where the actor appears sad at keyframes 10–11, happy at keyframes 12–13, and laughing at keyframes 14–16."

According to one embodiment of the invention, the gestures listed in each animation channel are mutually exclusive. Thus, two gestures in different animation channels may be invoked at the same time. However, the gestures listed within an animation channel are not mutually exclusive and cannot be invoked at the same time.

The library object's companion file is stored with a "CDS" extension (e.g. "Popeye.cds"). However, a separate CDS file may not be necessary if the third party tool used to create the library object allows the animator to specify additional information about the object within the library object's file itself.

In step 80, the animation module 15 invokes a key reduction subroutine for minimizing the animation data stored in the scenes while maintaining an acceptable level of quality in the processed animation. The key reduction subroutine is described in further detail below with respect to FIG. 7.

In step 82, the animation module exports the scene files and library object files from 3D Studio MAX. In exporting the scene files, the animation module 15 examines a scene's CDS file for the list of the library objects in the scene and their root nodes. The animation module 15 removes from the scene the geometry information associated with the library objects, leaving the node names and the associated animation data. The scene's 3DS file and CDS file are merged into a master scene file and saved in the mass storage device 12 with a "S3D" extension (e.g. "101.S3D") In exporting the library object files, the animation module 15 merges a library object's 3DS file and CDS file into a master library model file. The master library model file is also stored with a "S3D" extension (e.g. "Popeye.S3D"). The merged S3D file includes the library object's 3D geometry information and gesture animation data from the S3D file, and the object's root node name and gesture names from the CDS file.

Figure 3A:
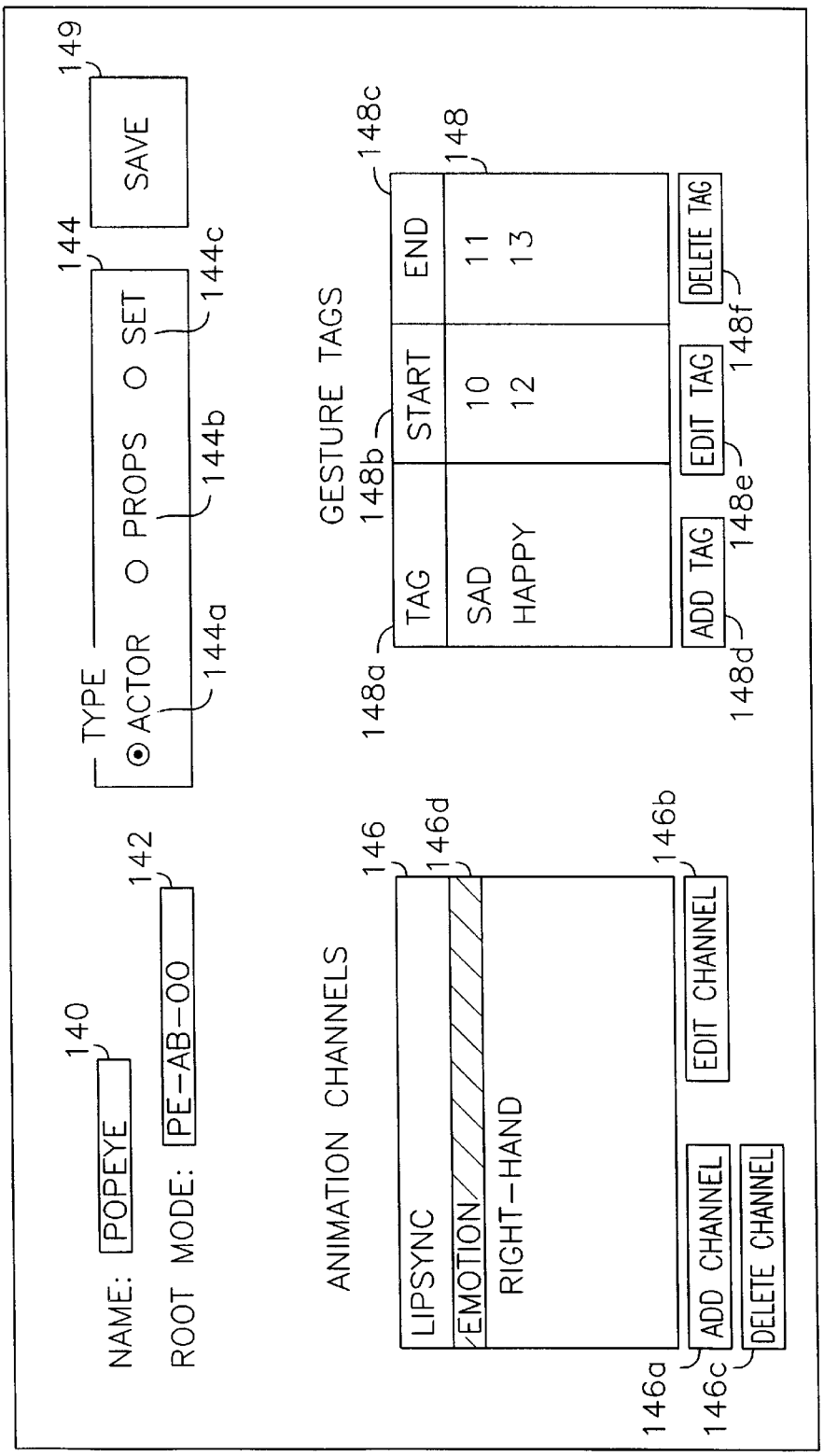
FIG. 3A is an illustration of a graphics user interface for creating a CDS file for a library object.

FIG. 3A is an illustration of a graphics user interface (GUI) provided by the server 5 (FIG. 1) for display on the personal computer 8 allowing the user to create a CDS file for a library object. The illustrated GUI includes a Name field 140 where the user enters the proper name of a library object using the computer's keyboard 8b and mouse 8c. The user further enters the library object's root node in a root node field 142.

The GUI further provides three types of library objects 144 to select from: Actors 144a, Props 144b, and Sets 144c. The user selects a particular type of library object using the computer's mouse 8c based on the type of the library object.

The GUI also allows the user to add animation channels in an animation channel area 146 by actuating an Add Channel button 146a. Animation channels are edited by actuating an Edit Channel button 146b and deleted by actuating a Delete Channel button 146c.

A particular gesture for an animation channel listed in the animation channel area 146 is added by the user by selecting a desired animation channel 146d and entering the relevant gesture tag. The gesture tag is displayed in a gesture tags area 148. Included in the gesture tag is a gesture name 148a, a start keyframe 148b, and an end keyframe 148c. Gesture tags are added by selecting an Add Tag button 148d. Gesture tags are also edited and deleted by selecting an Edit Tag button 148e and a Delete Tag button 148f, respectively.

Figure 3B:
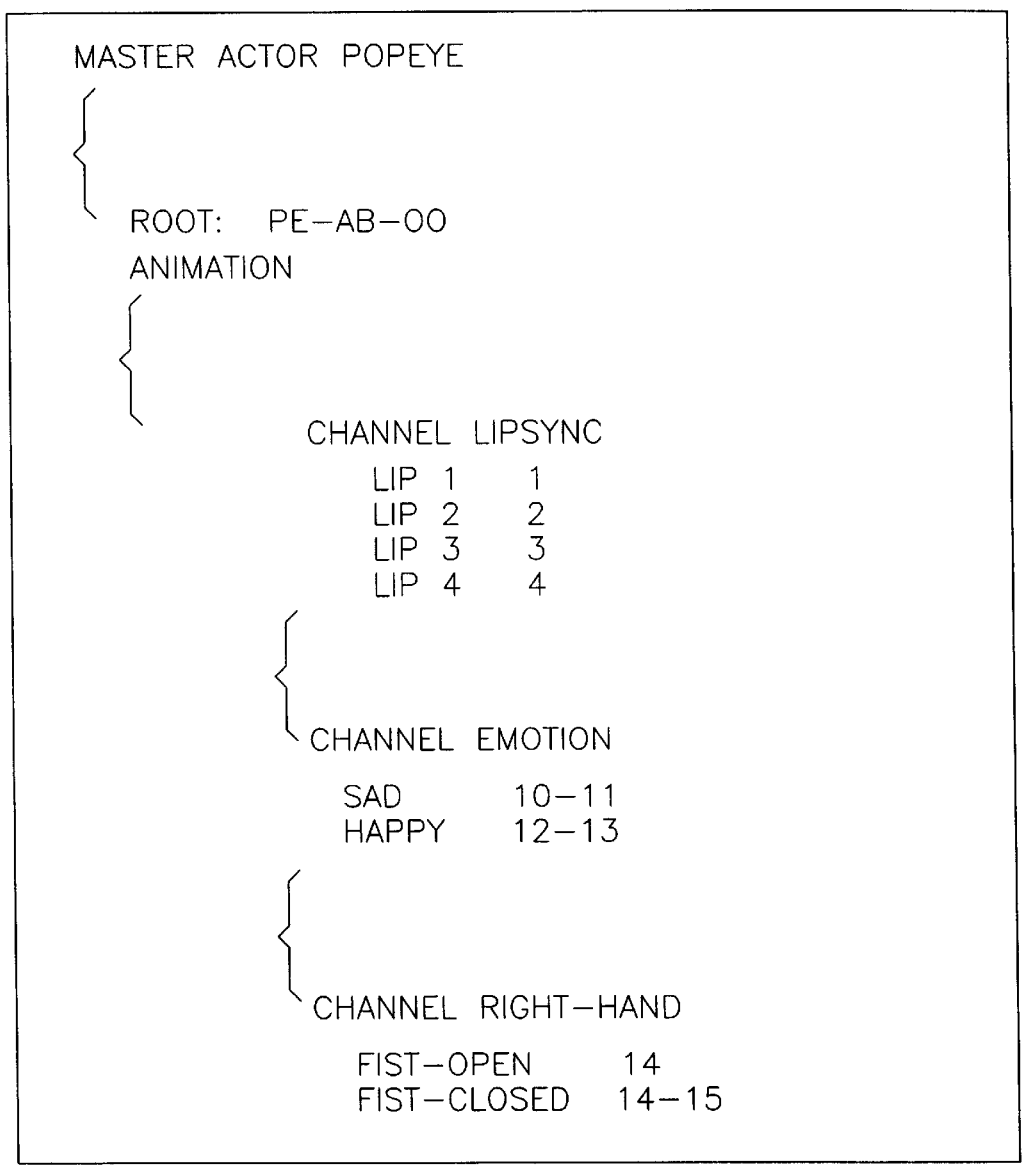
FIG. 3B is an illustration of an exemplary CDS file format.

The user next actuates a Save button 149 to create the CDS file with the specified information. In this regard, the animation module 15 retrieves the information entered by the user, and organizes them into the CDS file in accordance to a pre-defined format. FIG. 3B is an exemplary CDS file format.

Figure 4:
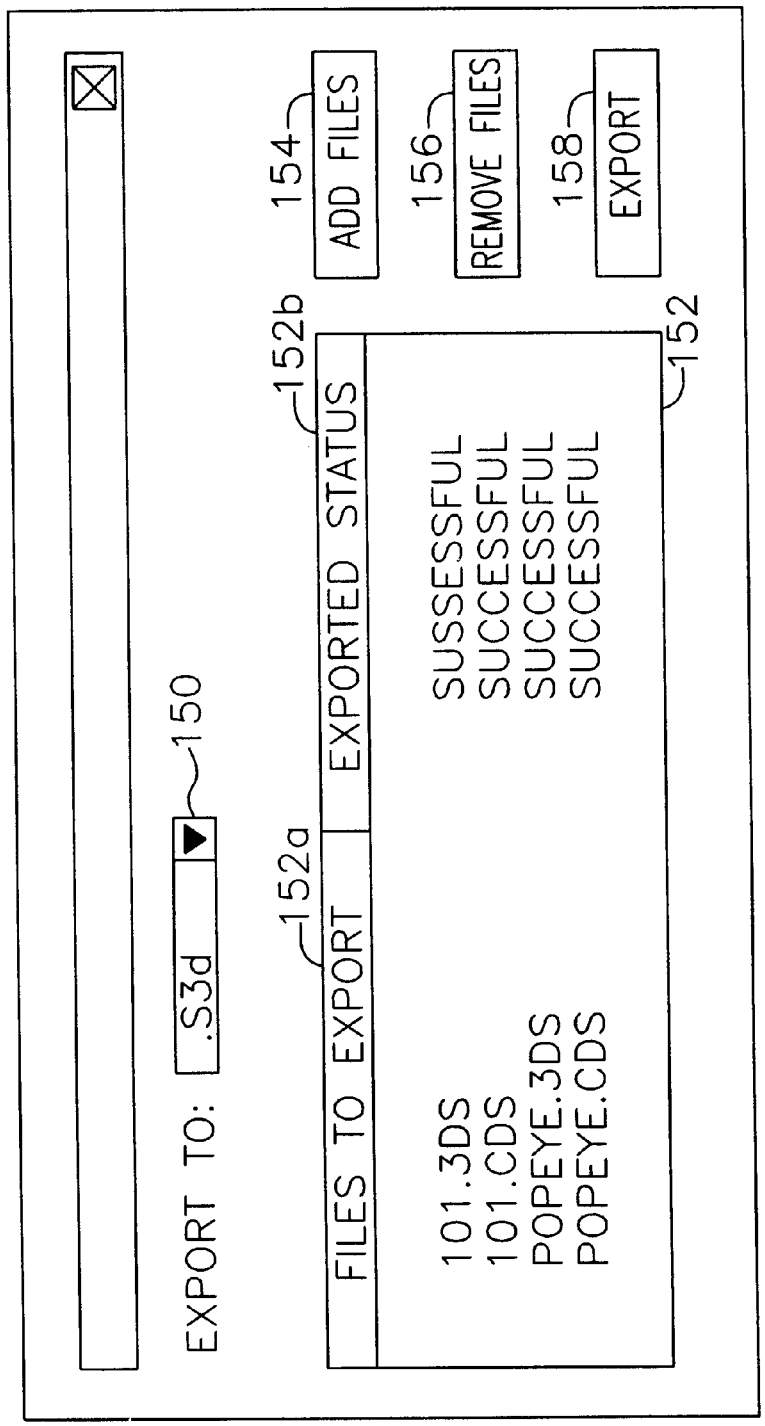
FIG. 4 is an illustration of a graphics user interface for exporting S3D files and CDS files into S3D files.

FIG. 4 is an illustration of a GUI displayed on the personal computer 8 allowing the user to export S3D files and CDS files into S3D files. The GUI allows a user to enter the name of a desired file extension 150 in which to export a file. The names of all files to be exported are listed in an information area 152 under a Files to Export section 152a. An Exported Status section 152b of the information area 152 indicates whether the export of a file was successful.

The GUI provides an Add Files button 154 allowing the user to enter the name of a file to be exported into the Files to Export Section 152a. A Remove Files button 152b allows the user to remove the name of a file to export from the Files to Export section 152a.

The user invoices the export function by actuating an Export button 158. In exporting a 3DS file and its companion CDS file into an S3D file, the animation module 15 merges the data in the 3DS file with the data in its companion CDS file, and saves them into the S3D file. Thus, if the 101.3DS and 101.cds files are exported, the animation module 15 creates a new 101.S3D with the merged data.

FIG. 5 is a schematic layout diagram of a directory structure of files stored in the system's mass storage device 12. The files belonging to a particular multipath movie is stored under a project directory 205 named after the movie.

Each project directory 205 includes a models subdirectory 206 and a sound subdirectory 207.

The models subdirectory 206 in turn includes an actors subdirectory 208 and a scenes subdirectory 209. The actors subdirectory 208 includes folders for each actor 210a, 210b appearing in the movie. Each actor's folder 210a, 210b includes the actor's 3DS file 211a and CDS file 211b, as well as the S3D file 211c created from the merging of the 3DS and CDS files 211a, 211b. Each actor's folder further includes an image sub-folder including texture information for the actor.

The scenes subdirectory 209 includes folders for each scene 212a, 212b in the movie. Each scene folder 212a, 212b includes the various scene 3DS files 213a and scene CDS files 213b, as well as various scene S3D files 213c created from the merging of a given scene 3DS file 213a and a given scene CDS file 213b. Each scene folder 212a, 212b further includes a message file 214 and preload file 215. The message file 214 includes a time ordered list of runtime messages for the scene. The preload file 215 includes a list of all the files to be used in the scene.

Figure 20:
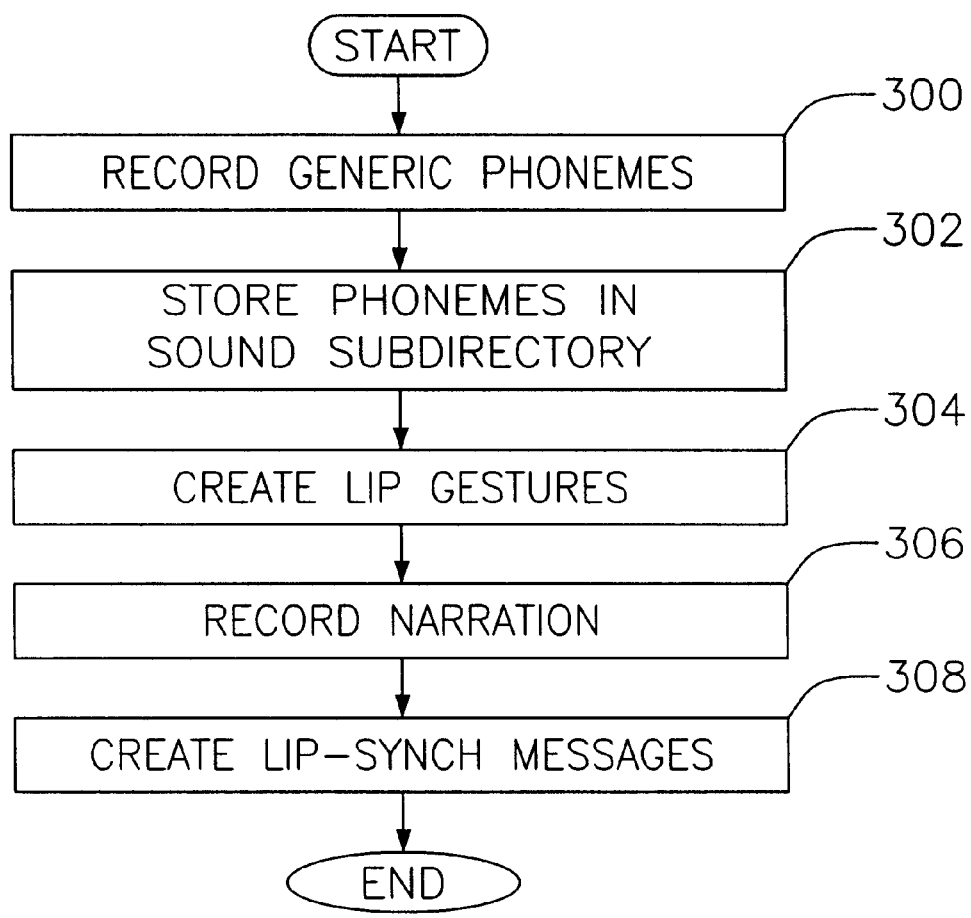
FIG. 20 is a flow diagram of a software program for creating audio and lip animation data for an actor of a mutipath movie.

The sound subdirectory 207 under each project directory 205 includes a list of sound files and associated lip-synch files for each actor in the movie, as is described in further detail below in conjunction with FIG. 20.

A. KEY REDUCTION

As described above, each scene includes a hierarchy of nodes with animation information attached to them. Animation data is stored in a series of keyframes. Each keyframe defines a position/scaling and rotation quantity defined for the node for a particular time. For example, the position of an object in 3D space might be defined over the time period 1–100 seconds with the following three keyframes:

Time 0 ($x = 0, y = 0, z = 0$)

Time 50 ($x = 0, y = 100, z = 0$)

Time 100 ($x = 0, y = 0, z = 0$).

According to these keyframes, the animation of the object includes starting at the origin, moving up 100 units on they y-axis over 50 seconds, and then returning to the origin at 100 seconds.

To find the value of an animation quantity at time for which there is no keyframe defined, the 3D engine 25b, 60d (FIG. 1) interpolates between the existing keyframes to create an animation metacurve. According to one embodiment of the invention, hermite interpolation is used for position and scaling animation, and spherical quadratic interpolation is used for rotation animation. A person skilled in the art should recognize that various other types of interpolation methods may also be used, such as linear interpolation for position animation, spherical linear interpolation for rotation interpolation, or a combination of two different kinds of interpolations for either position or rotation animation.

The present system allows reduction of the number of keyframes associated with each metacurve stored for a scene. The reduced number of keyframes reduces the amount of animation data associated with a scene, and aids in the streaming of the animation data over the Internet.

Figure 6:
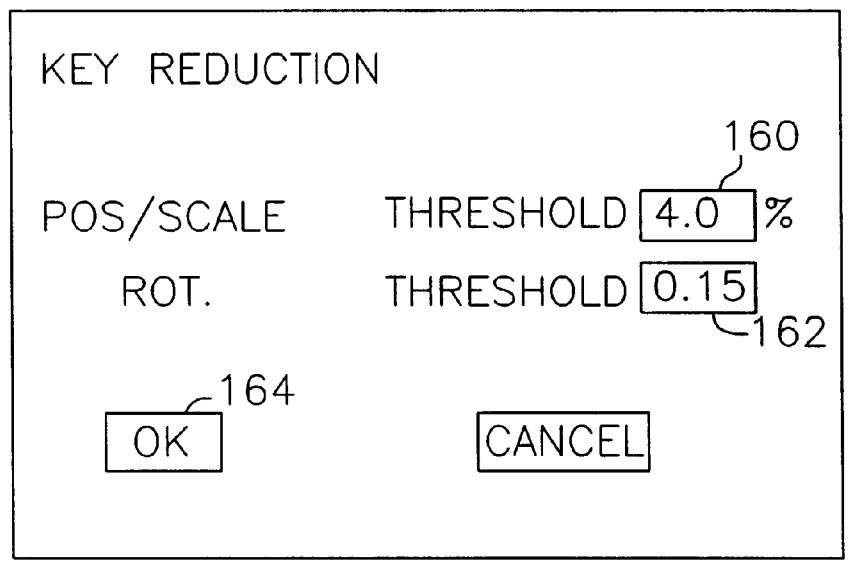
FIG. 6 is an illustration of a graphics user interface for invoking a key reduction of animation keys in a multipath movie.

FIG. 6 is an illustration of a key reduction GUI for implementing the key reduction subroutine 80 of FIG. 2. The illustrated GUI is displayed upon actuation of the Export button 158 (FIG. 4) prior to exportation of S3D and CDS files to S3D files. The key reduction GUI allows a user to specify a threshold value for position, scaling, and rotation animation.

Accordingly, the key reduction GUI includes a position/scale threshold input area 160 where the user may enter a master position/scaling threshold value to be used in performing key reduction of position/scaling animation. The GUI further includes a rotation threshold input area 162 where the user may enter a master rotation threshold value to be used in performing key reduction of rotation animation. In this way, users may control the amount of key reduction performed for each type of animation. Actuation of an OK button 164 initiates the key reduction process.

Figure 7:
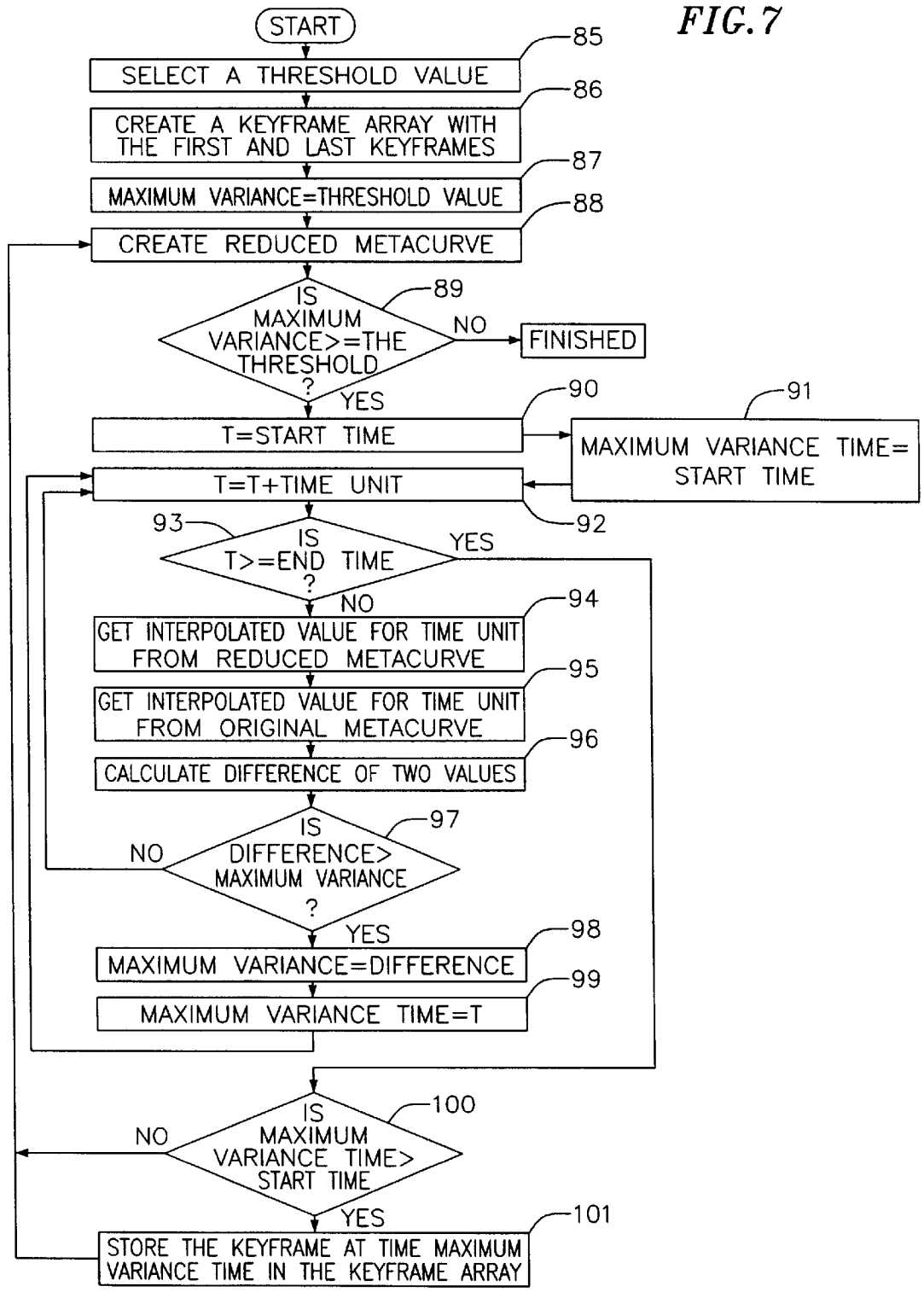
FIG. 7 is a flow diagram of a software program for implementing key reduction of animation keys in a multipath movie.

FIG. 7 is a flow diagram of a software program for reducing the number of keyframes associated with a particular metacurve. According to the illustrated key reduction program, a reduced number of keyframes is selected from the original set of keyframes (source keyframes) so that the metacurve created from the reduced number of keyframes (reduced metacurve) does not deviate from the original metacurve by more than a predetermined threshold value. The program thus starts, and in step 85, selects a threshold value. The threshold selection process is described in more detail below in conjunction with FIG. 8.

After the threshold value is determined, the program in step 85, creates a keyframe array for storing the reduced number of keyframes selected from the source keyframes. According to one embodiment of the invention, the keyframe array always includes the first and last source keyframes. In this way, the first and last source keyframes are never discarded during the key reduction process.

In step 87, the program creates a temporary variable, called "Maximum Variance," and initializes it to the value of the threshold from step 85. The Maximum Variance variable is used to denote the maximum amount by which the reduced metacurve differs from the source keyframe data.

In step 88, the program interpolates the keyframes in the keyframe array and creates a reduced metacurve. Separate metacurves are created for position animation and for rotation animation.

In step 89 the program checks to see if the maximum variance of the reduced metacurve from the source keyframe data is less than the threshold. If it is, the reduced keyframe data is acceptably accurate and the process ends. If not, the program loops over the time segments defined by the source keyframe data and calculates the difference between the source keyframe data and the reduced metacurve from a start time point to an end time point define by the source keyframes. In doing so, the program, in steps 90 and 91, initializes a temporary time T and a temporary Maximum Variance Time to both equal to the start time of the source keyframe data. In step 92, the value of time T is increased to the next time point defined by the source keyframes. In step 93, the program inquires if T is greater or equal to the end time point. If the answer is NO, the program, in step 94, retrieves from the reduced metacurve the interpolated value at the time T. In step 95, the program retrieves the interpolated value from the original metacurve for the same time T. In step 96, the program calculates the difference of the two values and inquires in step 97 if the difference is greater than the current value of the Maximum Variance variable. If the answer is YES, the program, in step 98, updates the Maximum Variance variable to be equal to the difference, and further takes a note in step 99, of the time point at which this occurs. The Maximum Variance variable is then set to be equal to the difference calculated.

Once the loop over all the time points is complete, the program, in step 100, checks whether the Maximum Variance Time variable has been updated. If it has, the program, in step 101 adds a new key to the reduced keyframe array at the time point defined by the Maximum Variance Time variable at which the Maximum Variance occurred. The program then returns to step 88 to create a reduced meta-curve with the keyframes in the reduced keyframe array. In this way, the program will continue to add keys to the reduced keyframe array at the point of greatest error, until the reduced keyframe array is acceptably close to the source keyframe data.

Figure 8:
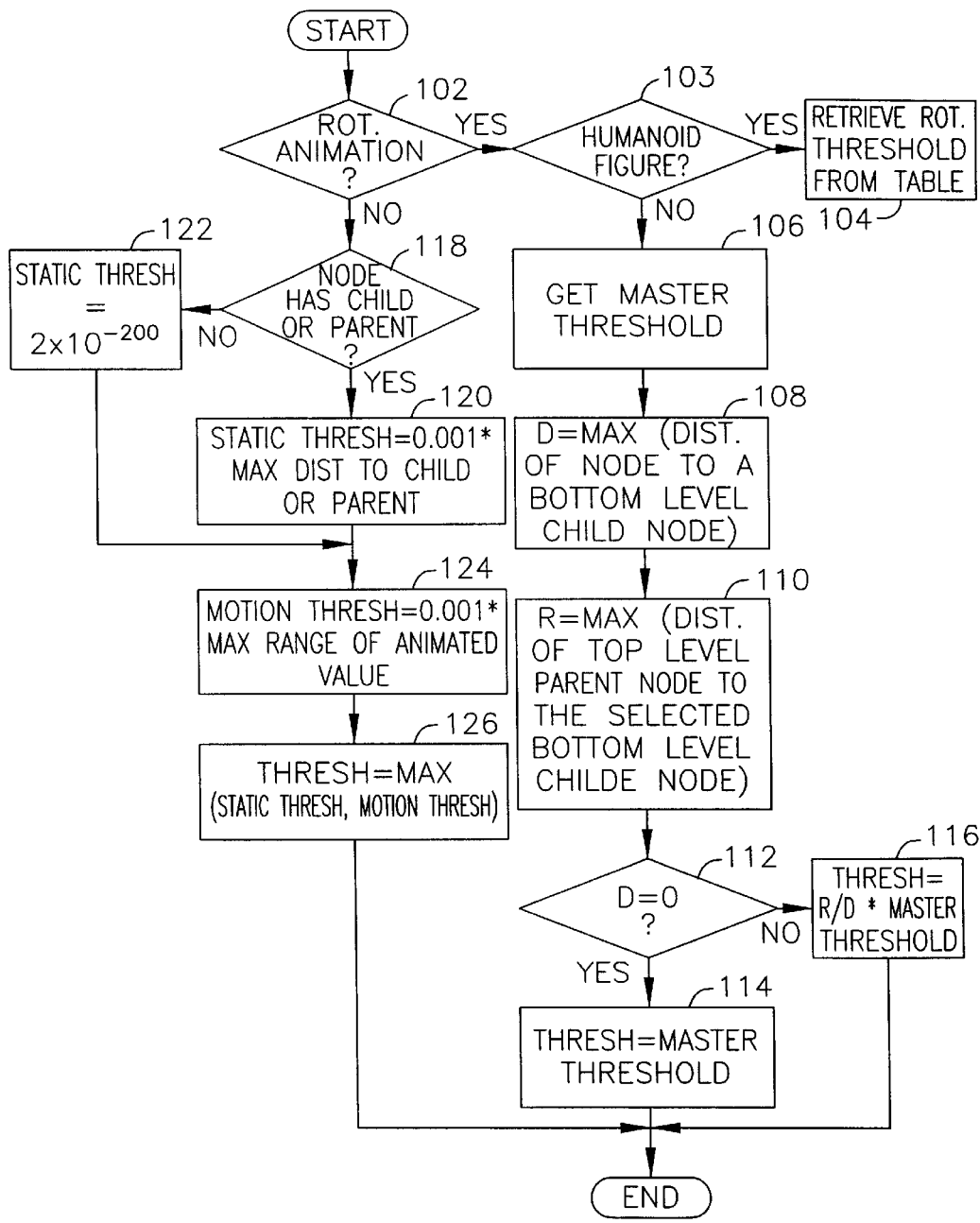
FIG. 8 is a flow diagram of a software program for implementing a threshold selection step of the key reduction process of FIG. 7.

FIG. 8 is a flow diagram of a software program for implementing the threshold selection step 85 of FIG. 7. A child node inherits the animation associated with its parent nodes. Accordingly, a child node also inherits an animation error present in a parent node. Thus, for rotation animation, less error is afforded in the rotation animation of the top nodes than the rotation animation of the bottom nodes. The nodes at the top of the hierarchy, therefore, are given a smaller threshold error value than the nodes at the bottom of the hierarchy.

For position and scaling animation, the threshold value varies based on how big the object is, and how far the node is moving. A bigger threshold of error is afforded for big objects and for objects that move far. A smaller threshold of error is afforded for small objects and objects with limited movements.

Figure 9:
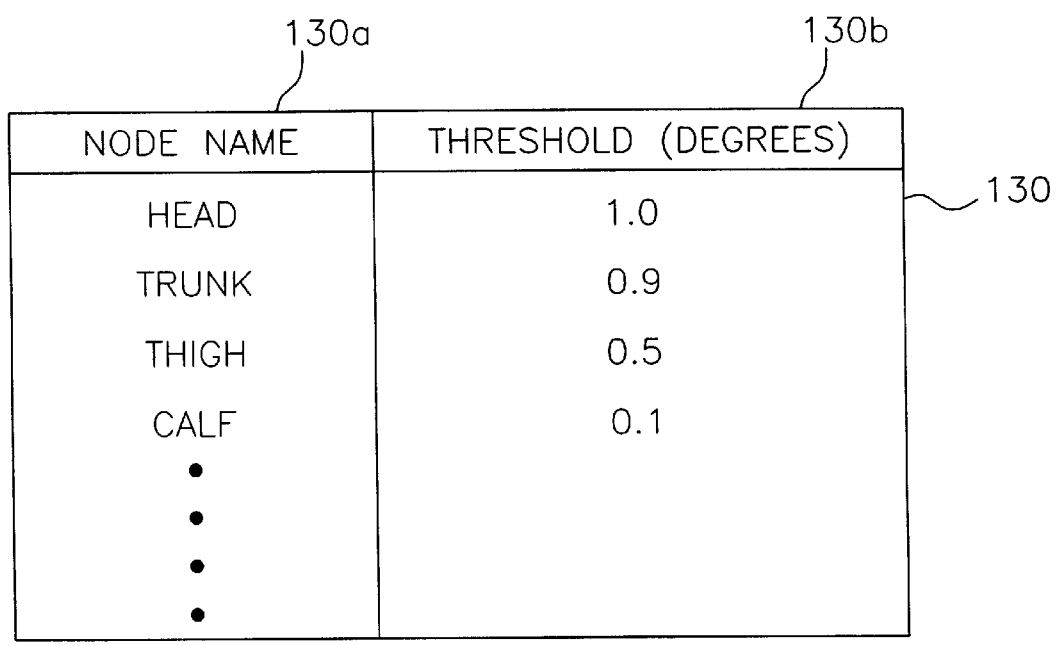
FIG. 9 is a schematic layout diagram of a master threshold table.

Accordingly, the program in FIG. 8 starts, and in step 102, inquires if the animation is a rotation animation. If the answer is YES, the program inquires, in step 103, if the node being examined is part of a humanoid 3D object. If the answer is again YES, the program obtains the threshold value from a master threshold table. FIG. 9 is a schematic layout diagram of a master threshold table 130. According to one embodiment of the invention, the master threshold table 130 is configured as sequential entries, each entry specific to a node belonging to a humanoid 3D object. Each node entry includes a node name field 130*a* which indicates the name of the node as a text string. Each node entry further includes a threshold value field 130*b* which indicates a pre-assigned threshold in terms of degrees.

In retrieving the appropriate threshold value from the master threshold table 130 according to step 104, the program searches the node name field 130*a* for a text string matching the node name of the node being examined. When such a node entry is found, the program proceeds to retrieve the threshold value associated with the node entry.

Referring back to FIG. 8, if the node being examined is not part of a humanoid 3D object, the program, in step 106, retrieves a master threshold value entered by the user of the system through the GUI illustrated in FIG. 6.

In step 108, the program calculates the maximum physical distance from the current node to its bottom-level children nodes. In doing so, the program recursively steps down the hierarchy of nodes until it reaches the bottom-level nodes, and determines the physical position of each of the bottom-level nodes within a scene. The program next computes a distance from the current node to each of the bottom-level nodes, and selects a node with the maximum physical distance. The maximum physical distance is stored as a distance D.

The program, in step 110, next calculates the maximum distance from the current node to its top-level parent node. In doing so, the program recursively steps up the hierarchy of nodes until it reaches the object's top-level node, which is one node below the object's root node. The program determines the physical position of the top-level node within a scene, and computes the distance from the top-level node to the selected bottom-level child node. This distance is stored as a distance R.

In calculating the final rotational threshold for the current node, the program first inquires in step 112 if the calculated distance D is equal to zero. If the answer is yes, the current node is one of the bottom-level nodes, and the final rotation threshold value is set to the maximum rotation threshold value indicated by the user. Thus, the final rotation threshold value is set to the master rotation threshold value entered by the user as is indicated in step 114.

On the other hand, if the calculated distance D is not zero, the program, in step 116, sets the final rotation threshold as follows:

$$THRESH = master\_rot\_thresh * R/D$$

According to this formula, the final rotation threshold value increases as the current node is closer to the bottom node, and decreases as the current node is closer to the top node.

Referring again to step 102, if the animation is not rotation animation, the program proceeds to calculate the threshold value for position/scaling animation. In doing so, the program first computes a static threshold based on the size of the 3D object being animated. Accordingly, the program inquires in step 118 whether the node has a child or a parent node. If the answer is YES, the program, in step 120, gages the size of 3D object being animated by calculating the physical distance from the node to its immediate child node and the physical distance from the node to its immediate parent node. The program selects the maximum of the two as a static distance S. The program then multiplies the static distance S with a pre-determined constant value, such as 0.001, to compute a static threshold that is based on the size of the 3D object.

If the node does not have a child or a parent node for gaging the size of the 3D object, the program, in step 122, sets the static threshold to a conservative value, such as $2 \times 10^{-200}$.

In step 124, the program also computes a motion threshold based on the extent of position/scaling animation for the particular node. In doing so, the program determines the maximum range of position and scaling values for the node. The calculated maximum range of animated value is multiplied by a pre-determined constant value, such as 0.0001, to compute a motion threshold. Thus, if the maximum range of motion for the current node is from position x=0, y=0, z=0 to position x=0, y=100, z=0, the motion threshold is 0.01.

In step 126, the program sets the position/scaling threshold as the maximum of the static threshold and the motion threshold. In an alternative embodiment, the position/scaling threshold is the maximum of the static threshold, motion threshold, and a user-entered master position/scaling threshold values.

B. ANIMATION AND TEXTURE OPTIMIZATION

According to one embodiment of the invention, the movie editing module 25 (FIG. 1) allows optimization of animation and texture data associated with a movie. In doing so, the movie editing module 25 invokes the 3D engine 25*b* to play the movie for collecting statistical information about the movie. The collected data relates to the visibility of the nodes in the 3D models, and the scaling of bitmap data displayed as textures on those nodes. In this regard, for every frame during playback, distance from viewpoint data is collected for nodes inside the field of view (view frame), and maximum scaling (expansion) data is collected for bitmaps that are inside the view frame.

The collected data is used by the movie editing module 25 to further reduce the number of animation keyframes associated with the nodes. For example, textures that are never seen during playback may be dropped, and textures that only appear in the far distance may safely be reduced in size without compromising the visual quality of the movie.

The collected data is also used by the movie editing module 25 to perform texture optimization. During texture optimization, texture data associated with nodes outside the view frame are deleted. Furthermore, the size of a texture bitmap file is modified based on the maximum scaling (expansion) performed on that bitmap when overlaying it over a polygon during movie playback. If the polygon is only viewed at a distance, it covers only a small area of the view frame and therefore, a big texture bitmap need not be maintained for the polygon.

Figure 10:
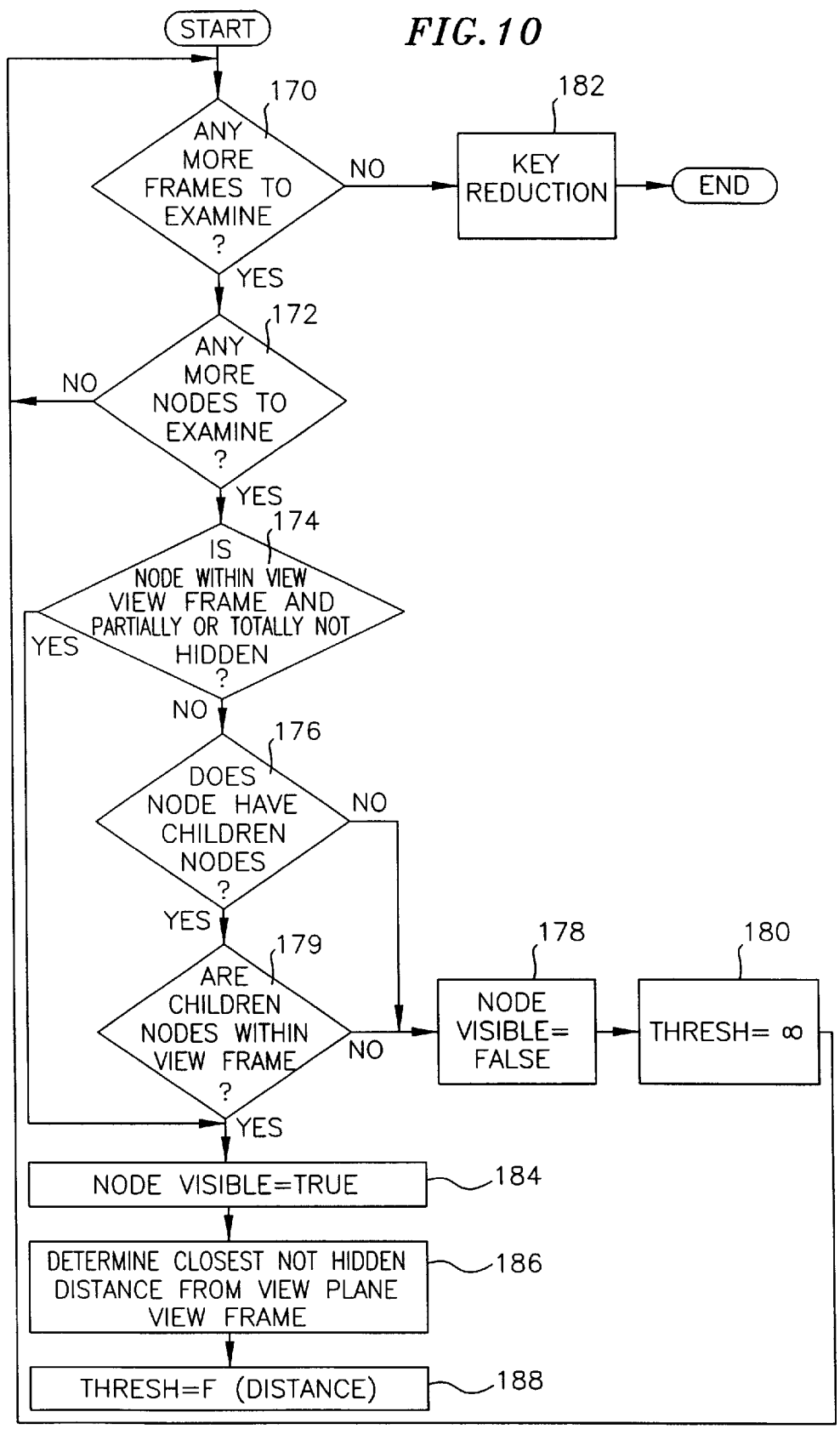
FIG. 10 is a flow diagram of an animation optimization software program.

FIG. 10 is a flow diagram of an animation optimization software program. According to the illustrated flow diagram, the movie editing module analyzes the visibility of a node as the 3D engine 25b renders each frame during the playing of the movie. The program samples the display time at increments of 25 frames per second, for the full duration of the movie (or selected subset thereof). The 3D engine 25b renders the movie frame for each frame (segment of time), passing the data about node visibility and bitmap scaling back to the optimization program as the rendering is performed.

Rendering a 3D image from a mathematical model held in a computer memory is a well-recognized process familiar to those skilled in the art. Optimization is an additional procedural step performed during the rendering process. The process of optimizing an entire movie is a repeated application of the optimization of a single frame of that movie, which is described below.

The program illustrated in FIG. 10 starts, and in step 170, it inquires if there are any more frames that need to be rendered. If the answer is YES, the program proceeds to step 172 where it inquires if there are any more nodes within the frame to be examined. If the answer is again in the positive, the program inquires, in step 174, whether the node being examined is within the view frame. In doing so, the program monitors the rendering of the polygons associated with the node. Polygons are rendered on a pixel-by-pixel basis. Each pixel defines an x, y, and z coordinate values of the display screen where the pixel is to be drawn. If the pixel is within the view frame and not obscured by other objects, the 3D engine writes the z-coordinate of the current pixel into a z-buffer. Thus, if the z-coordinate of a pixel associated with a node is written into the z-buffer, the node is deemed to be within the view frame and thus, visible. However, if none of the z-coordinates of the pixels associated with the node are written to the z-buffer, the node is deemed to be outside the view frame and thus, invisible.

If the node is outside the view frame, its animation data may or may not be removed based on the visibility of its children nodes. The children nodes inherit the animation data of a parent node. Thus, removal of a parent node's animation data negatively affects the accuracy of the animation of a child node. The animation inaccuracy of the child node does not affect the quality of the 3D movie if the child node is not visible (i.e. outside the view frame). However, if the child node is within the view frame, the inaccurate animation of the child node deteriorates the overall quality of the 3D movie.

Accordingly, the program inquires, in step 176, whether the node being examined has any children nodes. If the node does not have any children nodes, the animation data for the node may be safely removed. Thus, the program proceeds to step 178 where it sets a Node Visible boolean associated with the node to FALSE. In step 180, the program sets a threshold value for the node to infinity for the time period associated with the movie frame being examined. The higher the threshold value, the more keyframes associated with the node are removed during a key reduction step 182.

According to one embodiment of the invention, the threshold values assigned to the nodes during the animation optimization process are stored in a threshold table 190 as illustrated in FIG. 11. The threshold table 190 includes a frame number field 190a, a time field 190b, a node name field 190c, and a threshold value field 190d. The frame number field 190a indicates a particular frame number associated with the movie. The time field 190b indicates, in seconds, the time in which a particular frame is presented to the viewer.

The node name field 190c indicates the name of the node in a frame for which key reduction is to be performed. The threshold value field 190d indicates the threshold value to be used during the key reduction process for rotation 190e and position/scaling 190f animation. The threshold value for a node may vary from frame to frame based on the visibility of the node and/or distance of the node.

Referring back to FIG. 10, if the node has one or more children nodes, the program inquires in step 179 whether any of the children nodes are within the view frame. If the answer is NO, the animation data for the node may again be removed. Thus, the program proceeds to steps 178 and 180 where the Node Visible boolean is set to FALSE, and the threshold value for the node is set to infinity.

If, however, the children nodes are within the view frame, the animation data of the node is not removed. Accordingly, the program, in step 184, sets the Node Visible boolean to TRUE. In this case, the node is deemed to be visible even if it is outside the view frame. In an alternative embodiment, the node is also deemed to be visible if its shadow is within the view frame even if the node itself is outside the view plane.

In situations where the node is within the view frame, the program determines, in step 186, the distance to the node from a view plane. The animation of a node that is far from the view plane need not be as accurate as the animation of a node that is closer to the view plane.

In determining the distance from the view plane, the program examines the z-buffer for the z-coordinates of the pixels of the polygons making up the node. The program retrieves the minimum z-value associated with the node and sets it as a minimum distance of the node from the view plane.

In step 188, the program sets a threshold value for the node based on the restricted minimum distance for the time period associated with the current frame. According to one embodiment of the invention, the threshold value is directly proportional to the retrieved minimum distance. Thus, the further away a node is from the view plane, the bigger the threshold value associated with the node. The calculated threshold value is stored in the threshold table 190 (FIG. 11).

After all the frames have been examined, the program performs in step 182 key reduction of the animation nodes. The key reduction process is described in detail above in conjunction with FIG. 7. Although the key reduction process described with respect to FIG. 7 uses a constant threshold value throughout the movie once the value has been computed for each node, the key reduction process of step 182 utilizes threshold values which may vary over time. In performing the key reduction step 182, the program retrieves the threshold value for the time period being examined from the threshold table 190 (FIG. 11).

Figure 12:
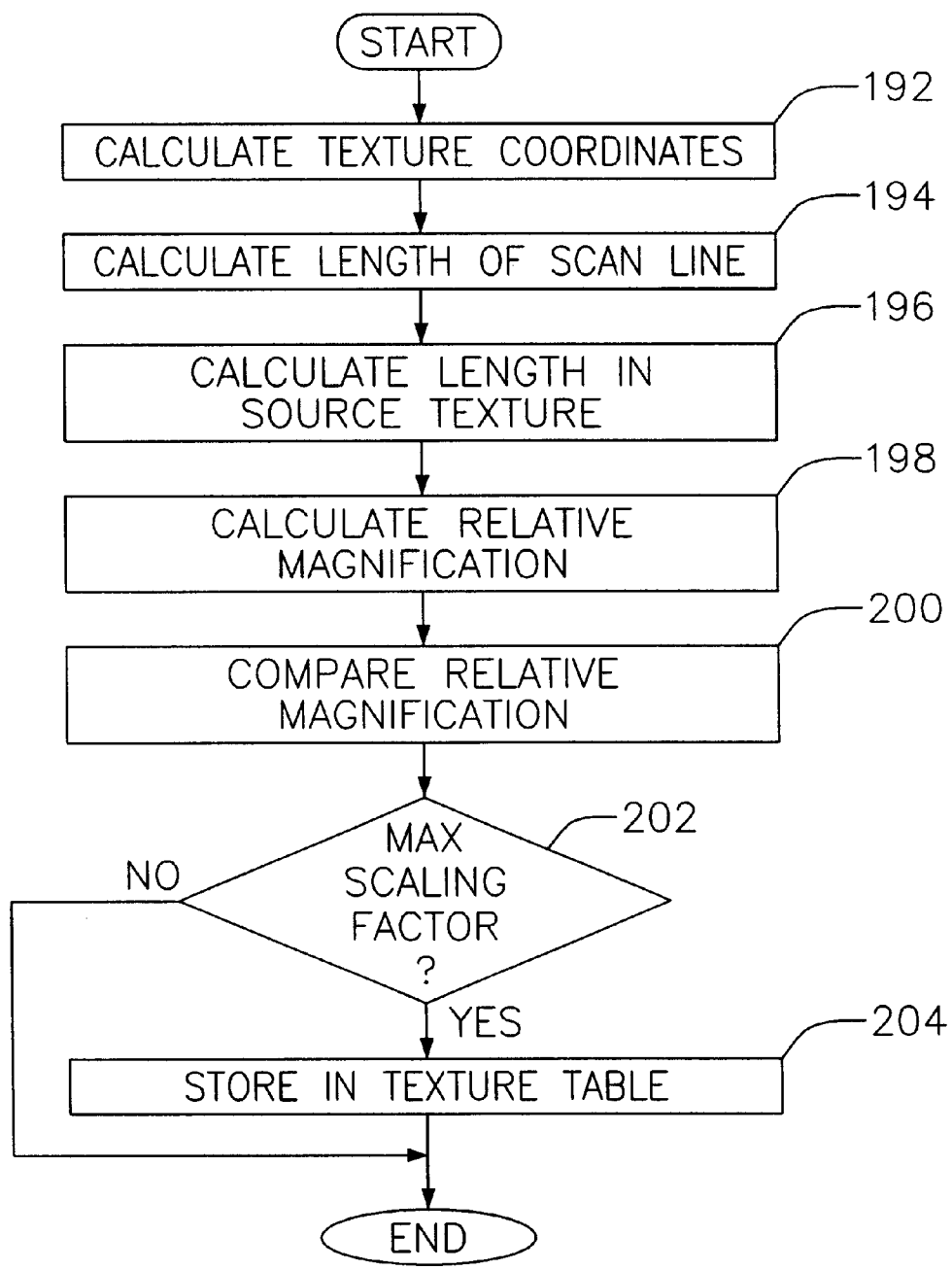
FIG. 12 is a flow diagram of a texture optimization software program.
Figure 13:
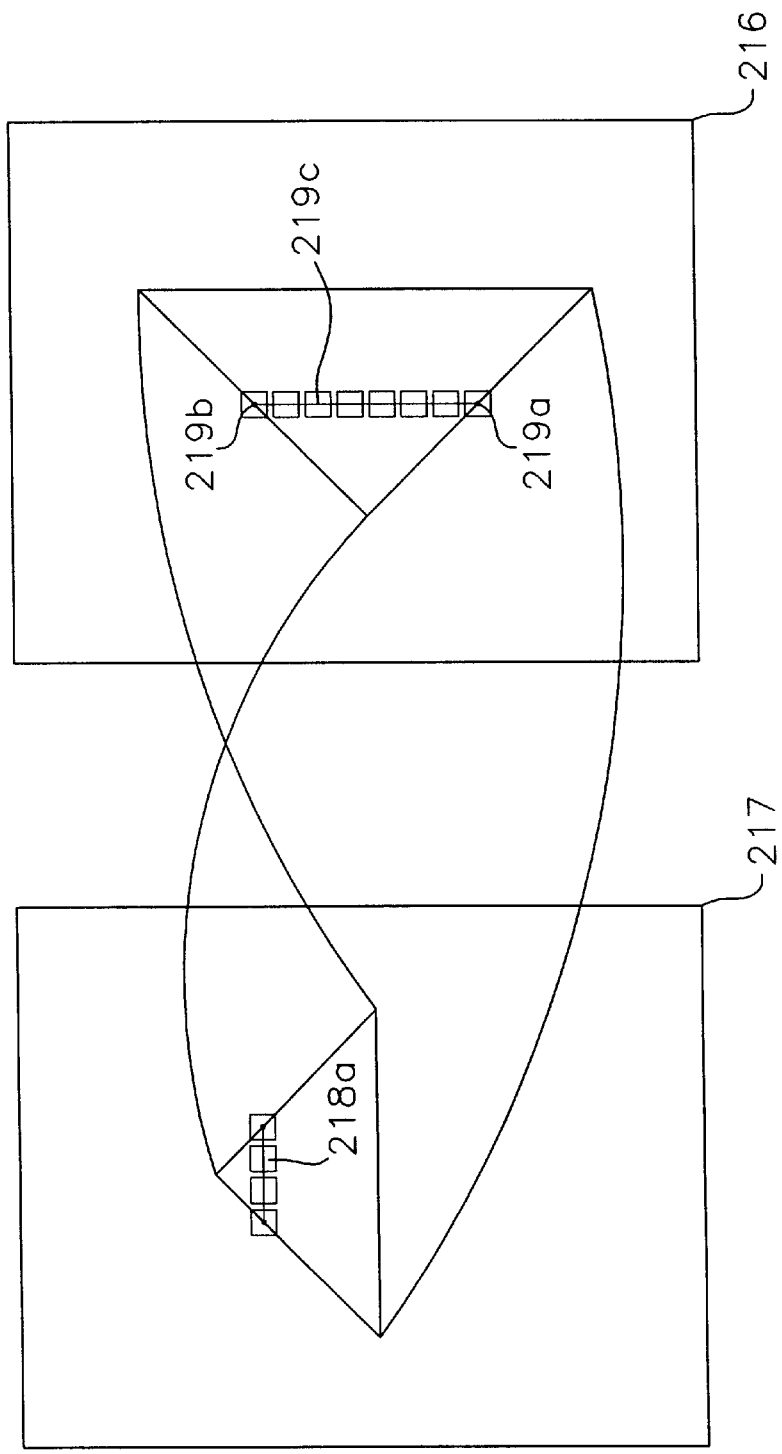
FIG. 13 is an exemplary illustration of a mapping of a texture in a texture map space to a screen space.

FIG. 12 is a flow diagram of a texture optimization software program according to one embodiment of the invention. The rendering (display) process carried out by the 3D renderer includes rasterizing each polygon that appears in a frame. The polygon rasterization process is well known in the art, and it involves the subdividing of the polygon into a series of scan lines for being rendered onto a screen space one scan line at a time. FIG. 13 illustrates a texture being mapped from a texture map space 216 to a screen space 217.

To apply texture-maps to the scan lines, the program, in step 192, calculates the texture coordinates of the start and end points of the scan line. Texture coordinates are the position inside the source texture map. The application of the texture map to the pixels on the screen is not necessarily linear (that is, the ratio of pixel scaling values at the beginning and end of the line may differ. For example, the polygon represented by the rasterized line may be sloped away from the viewer. Solution of the non-linearity of texture mapping is well known and familiar to those in this field. For the purposes of optimization of texture data, only the scaling factor at the closest point to the viewer is required, and the non-linear mapping of textures is unimportant. This scaling factor is analogous to the texture step-value of a single onscreen pixel at the point on the rasterized scanline that is closest to the viewer. By selecting the closest point to the viewer, the step value is calculated to be the largest for the entire rasterized line.

In calculating the step-value (i.e. the scaling value) of a scan line, the program, in step 194, considers the length in pixels of the scan line which is being rendered. In step 196, the program calculates the length (in pixels) of the conceptual line in the source texture from the start point to the end point. In step 198, the program calculates the relative magnification required to display the texture on the polygon at the particular scan line being considered. Ignoring non-linearity (as it is only the closest point magnification that matters), a simple division of these two lengths gives the relative magnification. Typically, textures will be much larger than the screen representation of the polygons onto which they are being mapped.

The optimization program receives from the rendering section of the 3D-renderer continual notification of textures being drawn during the rendering process, and the maximum scaling factors required for each line of each rasterized polygon. The scaling factor at the closest point (to the viewer) is compared with the previously recorded (in a table associating textures with scaling factors) maximum scaling factor for each texture, and the largest scaling factor is entered in a texture table. The closest point (to the viewer) is determined by comparing the Z-depth of the start and end point of the line. The texture coordinates for the start and end points of the rasterized line are known. These define a 'slice' through the source texture (at any angle). The length of this slice (in pixels), combined with the length of the slice (as it appears on the screen), is used to calculate the maximum scaling value used for display of that texture on this scan line. It is calculated to be smaller than, or equal to, the scaling value at the closest point, so the scaling value at that closest point is recorded in the texture table.

Recording continues until the end of movie rendering. The optimization program records the maximum scaling factor required for each line of each texture on each polygon drawn in each and every frame of the movie. The optimization program builds up a table which accurately indicates the distance (or, effectively, the scaling factor) at which each texture makes its closest approach to the viewer.

Accordingly, in step 200, the program compares the relative magnification calculated in step 198 with a corresponding value stored in the texture table. In step 202, the program inquires if calculated scaling factor depicts a maximum scaling factor. If the answer is YES, the program, in step 204, stores the computed scaling factor in the texture table.

Provision is made during playback of the movie to ensure that all textures that are visible are indeed seen. At the end of the optimization recording process, textures that have been allocated scaling values are, by definition, visible. All other textures can be discarded, as they were never visible during the playback process (at the selected frame rate). Textures that are visible can be processed, during the movie build process, using standard image-processing software, and reduced to more optimal sizes, based upon the recorded scaling data. At the end of the movie optimization analysis, the texture table stores the maximum magnification of each texture map actually visible to the viewer during movie playback.

The final stage of the optimization of textures consists of re-sizing the textures taking into account the maximum scaling factor for each. This technique allows the reduction of texture data size to a theoretical lossless minimum. The technique also allows reduction of texture data to an arbitrary size (i.e. smaller than the theoretical minimum), and distribution of loss-of-quality evenly throughout the entire texture data.

C. MULTIPLE OUTPUT FORMATS FROM A SINGLE PRODUCTION PROCESS

The present system allows an animator to create multi-path movies intended for different target platforms and audiences via a single production process. Thus, the creator need not start afresh each time a different target platform or audience is identified as receiving or viewing the movie. The creation of a movie for a particular target platform is termed a "build" for that platform.

The production process carried out in the 3D animation module 15 identifies data that appear in different builds. The identification of the data is termed "tagging." For 3D object model data, the tagged model data is first exported into a 3DS file through the interface software 15b to 3D Studio MAX.

The build process carried out in the publishing module 30 involves a selection of appropriate tagged data from the 3D object models, sound and text data, and the conversion of this data into a final (compressed) deliverable build. Builds can be created for multiple media including, but not limited to, delivery over the Internet, delivery via CD, or for veiwing on video or film.

There are several areas where tagging of data is used to present a different product to the viewer: (1) At the 3D model level, the interface software 15b allows the tagging of 3D model nodes based upon their suitability for various platforms and their rating; (2) at the message level, data such as sound and text can be tagged based on their rating and language suitability; (3) during creation of rendered movies (for cinema/video viewing), when a specific rating/language selection is chosen before the rendering of the movie, and the highest resolution model data is used; (4) at playback time, allowing the viewer to select filters for languages and rating, causing only the data that conforms to the viewer's selection to be actually shown/played; and (5) at playback, allowing the playback technology to switch between various models based on the quality and capabilities of the hardware on which the movie is being viewed.

Different tagging strategies are used for different types of data. A user may create one or more versions of a node when creating an object model. For instance, the user may create a version of a 3D model of an actor where each node of the actor is represented with 3000 polygons, and another version of the model where each node is represented by 20,000 polygons.

After the creation of a particular node, the user invokes the interface software 15b (FIG. 1) to 3D Studio MAX for designating the situations in which the node is to be displayed. This designation involves marking the node with tags. For instance, the higher resolution version nodes of the actor may be tagged as suitable for display on a high-end PC, or rendered to video, while the lower resolution nodes of the actor may be tagged as suitable for display on a low-end PC. The high resolution actor is then displayed when the movie is played on a high-end PC, but the low resolution actor is displayed when the same movie is played on a low-end PC. Video rendering "builds" always use the highest quality nodes that are available.

Figure 14:
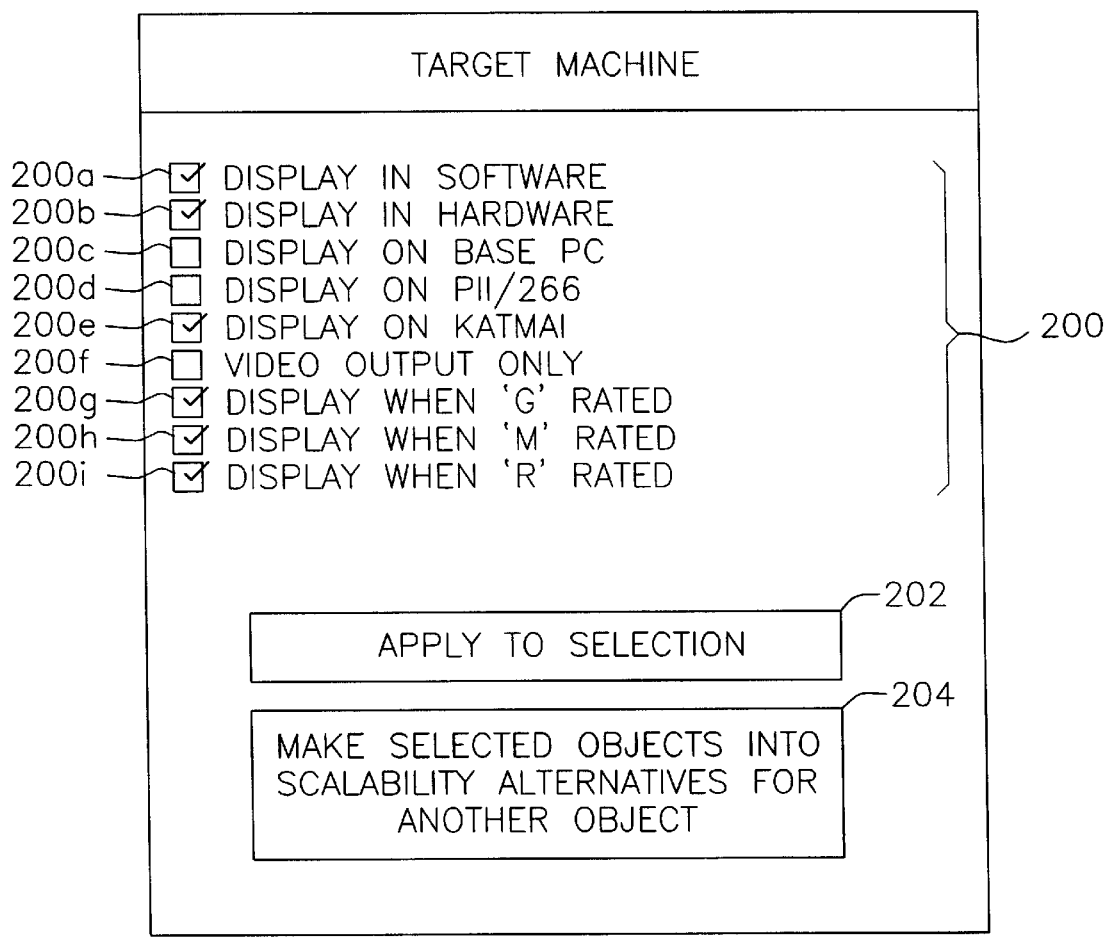
FIG. 14 is an illustration of a graphics user interface for placing tags on a 3D object.

FIG. 14 is an illustration of a GUI displayed on the personal computer 8 allowing a user to place different tags on 3D objects. The GUI provides a list of scalability tags 200 that the user may select using the keyboard 8b and/or mouse 8c. A display in software tag 200a indicates that the object is to be displayed only when not using 3D hardware, such as a 3D-accelerated graphics card. A display in hardware tag 200b indicates that the object is to be displayed only when using 3D hardware.

The user may also tag the 3D objects based on the speed of the target computer in which they are to be displayed. A display on Base PC tag 200c indicates that the object is to be displayed only on a minimum recommended machine (currently Pentium 166) or slower. A display on PII/266 tag 200d indicates that the object is to be displayed only on Pentium II or Pentium 266 class machines. A display on Katmai tag 200e indicates that the object is to be displayed only on Pentium III class machines.

An additional level of tagging allows data created in the production of a movie to be tagged with specific language and rating attributes. Some of this tagging is done on 3D model data, but in general the tagging can appear on other forms of movie data. Data such as sound, text, images and models can be tagged to specify the target audience for whom the movie is intended. This data can be filtered (i.e. portions of the data are not played) during playback, so that only the desired data is shown to the viewer of the product. A display when 'G' rated tag 200g indicates that the object is to be displayed only in 'G' rated versions of the movie. A display when 'M' rated tag 200h indicates that the object is to be displayed only in 'M' rated versions of the movie. A display when 'R' rated tag 200i indicates that the object is to be displayed only in 'R' rated versions of the movie. It is possible to include multiple versions of tagged objects in a final build, and allow the selection of which objects are displayed at the time the viewer is watching the product. For example, a build could include both English and French dialog, but only one of these would be shown to the viewer, based on his/her choice of language.

According to one embodiment of the invention, if the movie is to be streamed over the Internet, the user may further specify the bandwidth required for delivering the object. The publishing module 30 ensures that the data is packaged in such a way that the product can be delivered through the target media without exceeding the bandwidth limitations. In this regard, an assumption is made as to the bandwidth required for downloading an object tagged with particular scalability tags. For instance, an assumption may be made that an object tagged with a Base PC tag 200c is suitable for downloading if a detected bandwidth is 2 Kbps or lower.

A person skilled in the art should recognize that various other types of tags may also be used in alternative embodiments. Thus, the listed tags and their functionalities are exemplary and not intended to be limiting in any sense.

In tagging 3D models, the user selects as many tags as are applicable for a node. For instance, if a node is to be displayed in both 'G' rated and 'M' rated movies, the user selects the display when 'G' rated tag 200g as well as the display when 'M' rated tag 200h. If a node is to be displayed in all types of situations, all the scalability tags 200 are selected.

If the user creates multiple versions of a node, the user actuates a scalability alternate button 204 to specify that the current node is an alternate version of another node. Upon actuation of the scalability alternate button 204, the interface software 15b allows the user to specify the name of the node for which the current node is an alternate. For instance, if the user creates a low resolution leg of an actor to be displayed on a base PC, and further creates a high resolution leg of the same actor to be displayed on Pentium III machines, the user may set the high resolution leg of the actor as an alternate for the low resolution leg of the actor. The user does so by selecting the scalability alternate button 204 when the high resolution node is created, and entering the name of the low resolution node as the object for which the alternate is being created. If the node is just to be tagged, and is not an alternative to another node, the user just actuates apply to selection button 202.

During export of the nodes into an S3D file, the tags attached to the nodes are also exported and associated with each node's geometry information. If the animation module 15 detects that a particular node is an alternate for another node, the alternate node is not exported, and the geometry information associated with the alternate node is exported as being associated with the node for which the alternate node was created.

For other data, each datum is marked with either one rating and/or language tag, or is unmarked. Multiple data are entered to enable multiple language or rating support. For example, an English section of dialog would be marked as English, and a separate French section of dialog would be marked as French. Each may be marked with a rating, too.

Once the user has created 3D objects with the appropriate tags, the user may make a selective build of the movie where some or all of the tagged nodes of an object, and some or all of the other data (sounds, text, etc.) are included into the build by the publishing module 30.

Figure 15C:
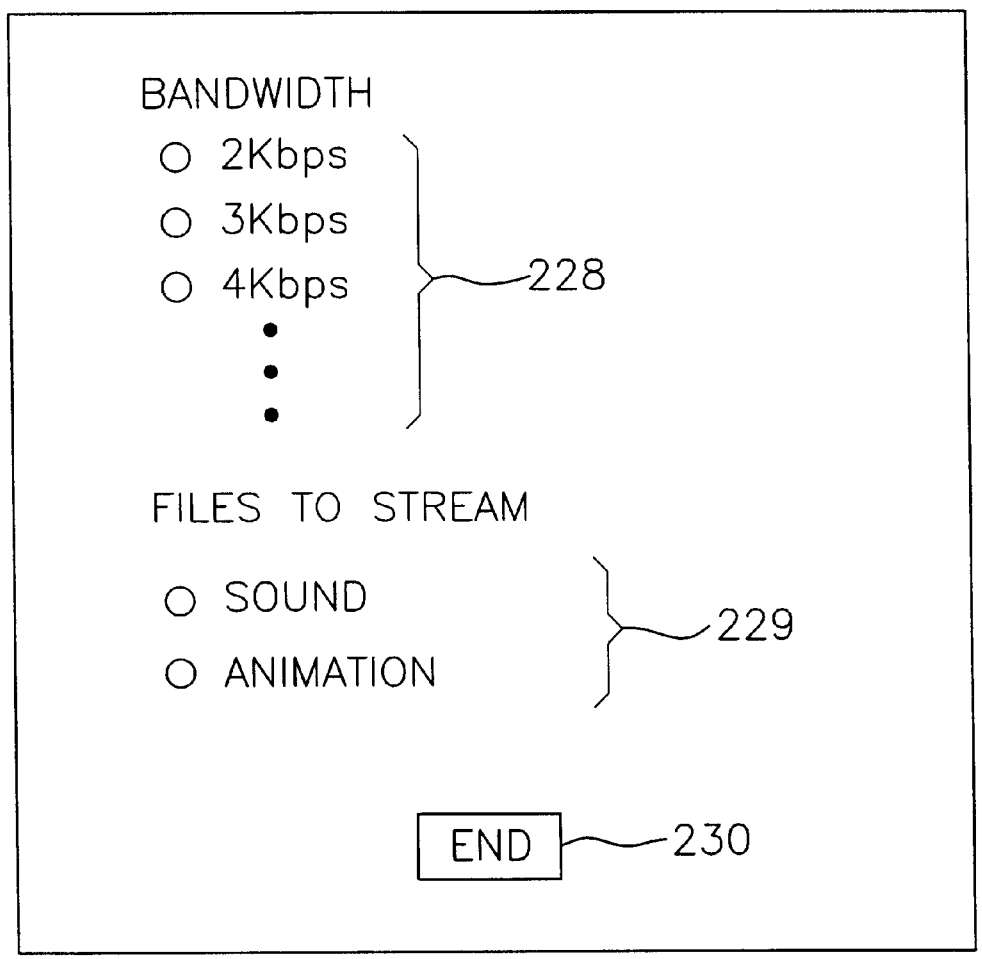

FIGS. 15A–15C are illustrations of GUIs displayed on the personal computer 8 which allows users to specify a type of build that the publishing module 30 is to perform. A CD build option 220 allows a user to conduct a single file build where the files to be used in the movie are packaged into a single build file. An Internet build option 221 allows the user to conduct a multiple file build where the files are stored in multiple build files for distribution over the Internet. The user specifies the location where one or more build files are to reside by entering the name of a build directory in a build directory input area 222.

The user also selects one or more scalability factors 223 to perform a selective build for a particular target platform or audience. In doing the selective build, the publishing module 30 accesses the mass storage medium 12 and selects only the data with the selected scalability factors 223 for storing them into one or more build files. For example, the user might make a Base PC build where the movie includes only low-resolution objects, if the movie is to be delivered over a storage or bandwidth-constrained medium, such as the Internet. A Base PC build is done by selecting a Base PC scalability factor 214*b*.

The user may further make a build including all of the objects by selecting all of the scalability factors 223. When the all-inclusive build is delivered on a CD, and the CD is inserted into any host computer 55, the projector module 60 selects the appropriate objects to display based on the CPU speed of the host computer and the viewer's selection of rating and/or language, as is described in further detail below.

The user may further select the types of sound tracks 224 to be used in the movie. For example, if the user desires to build a movie in English, the user selects an English sound track 224*a*. Based on the user selection, the publishing module 30 retrieves the appropriate sound files and any associated lip-synch files from the mass storage device 12, and stores them into one or more build files. Builds may include more than one language-tagged soundtrack, and the selection of which to use can be made at run-time when viewing the product.

In addition to the above, the user specifies the type of sound compression 225 and graphics compression 226 to be performed when doing the build. The publishing module 30 incorporates third-party sound compression tools such as the Voxware® compression tool, which is commercially available from Voxware, Inc., of Princeton, N.J., for sound compression. The publishing module uses JPEG compression and/or Wavelet compression for compressing graphics files. Other types of data may use ZIP compression to reduce space. Using such compression methods, the publishing module 30 parses all the files to be packaged in the movie and compresses the graphics and audio data accordingly.

The user further selects the scenes to be included in the build from a list of available scenes 227. If the entire movie is to be built, the user selects all the scenes associated with the movie. However, if only a preview of a movie is to be made for insertion into another movie, the user only selects the scenes which are to be included in the preview.

If the user desires a multiple file build, he or she selects the Internet build option 221 and specifies a bandwidth 228 for doing the Internet delivery. The user further specifies the type of files that are to be streamed over the Internet 229. The packaging of files for an Internet build is described in further detail below. The user then submits the build specifications by selecting an END button 230.

Builds to video and/or film bypass the publishing module 30 (and compression options), and directly render a movie to AVI format files. This rendering pre-selects the tags that are to be shown in the target media, and individually renders every frame of the movie, at the desired frame rate. AVI files are later converted/copied to the target media such as DVD, film, video, etc.

The above-described tagging and building mechanisms allow users to create different types of movies from a single production process. Once movie data has been created with various versions of audio files, sound and text data, objects, and the like, the user need not engage in the production process again to cater to different target platforms or audiences. The user may simply perform a build selecting the desired target platform and filters.

D. INTERNET STREAMING AND PRELOADING OF INTERNET STREAMED DATA

In doing an Internet build, the publishing module 30 divides the files in the scenes selected by the user into an upfront file and one or more stream files. The upfront file includes the non-streaming data files needed before the movie can be played. The projector module 60 resident in the host computer 55 downloads the non-streaming data files first prior to the playing of the movie. The stream files include animation and/or audio data that are streamed through the Internet during playback of the movie.

According to one embodiment of the invention, the upfront file includes a header portion and a body portion. The header portion acts as a directory structure that lists all the files used in the scenes of the movie. The body portion of the upfront file includes the data of some of the files listed in the header portion that are to be downloaded first prior to the playing of the movie. According to one embodiment of the invention, the body portion is used to store the master library model files (actor S3D files) with the geometry data of the library models appearing in the scenes, texture files (bmp files) with the texture data, and any portion of a streaming file that did not fit into the stream.

FIGS. 16A–16B are schematic layout diagrams of a header 232 with information for each file used for the run time retrieval of the data. Each entry starts with a name 232*a* of the file followed by a location code 232*b* and type code 232*c*. Each header entry further includes the length of each file 232*e*, 232*f*, and the file's version number 232*d*. In updating a file's version number, the publishing module 60 maintains a checksum for each file. If the current checksum for the file differs from its stored checksum, the file's version number is increased.

Different type codes 232*c* are used to identify different types of files. According to one embodiment of the invention, type "A01" indicates a bitmap file, type "A02" indicates a streaming sound file, type "A05" indicates a scene's preload file, type "A06" indicates a scene's message file, type "A07" indicates a streaming or non-streaming 3D data file, and type "A12" indicates a stream file. The data following the type code 232*c* is dependent on the location of the file as identified by the location code 232*b*.

The location code 232 identifies a file as being stored in the upfront file, on the Internet in a separate stream file, or both. According to one embodiment of the invention, the location code is represented in one byte. A location code of "A01" indicates that the file is stored in the upfront file and included in its header entry is an offset 232*g* into the upfront file for the start of the data, as is illustrated in FIG. 16A. A location code of "A05" indicates that the file is stored as part of a separate stream file on the Internet. The Internet stream files themselves also have an entry in the header and have a location code of "05" or "07." A location code of "05" indicates that all of the streamed data is in the stream file. A location code of "07" for a stream file indicates that some of the stream data that could not be fitted into the available bandwidth has been placed in the upfront download.

If the file is stored in a separate stream file, as indicated by location code "05," the header entry includes a stream number 232*h* and stream file index 232*i*. The stream file index 232*i* is a reference to the header entry that points to the actual stream file. The stream number is used to reference a stream of data within the stream file. Stream files can contain multiple data streams such as animation data and sound data. Within the stream file, the different data streams are divided into blocks and interleaved throughout the file. Each block has a header that includes an identifying stream number and a size.

According to one embodiment of the invention, the publishing module 30 creates a stream file for each scene in the movie and stores it with a ".dat" extension. Each stream file is chosen to be of a size which will allow the file to finish streaming before the scene is over. Thus, the maximum size of each stream file is based on the following formula:

SIZE=data rate*(left-over stream time+scene duration−number of branches*K)

The data rate element of the formula is the bandwidth 224 (FIG. 15C) selected by the user when specifying the type of build to perform. The scene duration indicates the stream time available for the current scene, and is obtained from the time given to the ENDSCENE message in the scene's message file. The left-over stream time is the stream time left-over from a previous scene which can be applied to stream time of the current scene. The number of branches indicates the number of different scenes that could be invoked next by the user. The number of branches is multiplied with a constant value (e.g. 3 seconds). In this way, room is left in the bandwidth to start streaming data for each of the possible scenes to be played next while the current scene is still playing.

The stream file created for each scene is streamed over the Internet in a series of blocks of data, each block being assigned a particular stream number. The blocks are assigned a position in the stream based on when the blocks are needed. Each block is streamed early enough in time for the data stored in the block to be available to the projector module 60 by the time the data is needed.

According to one embodiment of the invention, the data needed between time Ta and Tb is streamed early enough in time for the entire data to be able to reach the projector module 60 by time Ta. In this regard, the publishing module 30 calculates the time expected to take to stream the block based on the size of the block and the given data rate. The publishing module 30 then calculates the start time in which the block must be streamed to reach the projector module 60 by time Ta.

The time expected to stream the block determines the time by which a previous block can be received. For example, assume that Block 3 includes 20 Bytes of data that needs to be fully loaded at time 4 seconds into a scene. If the data rate is 2 Kbps, it should take 0.8 seconds to stream Block 3. Thus, Block 3 must start to be streamed at 3.2 seconds into the scene for the streaming to complete by time 4 seconds.

For the purpose of the above example, let's imagine that, in calculating in a similar way the time at which to start the streaming of Block 4, it is determined that the data must start to be streamed at time 3.5 seconds into the scene, for it to be fully available to the projector module 60 in time for its usage. Thus, there is a 0.5 second overlap between the start of the streaming of Block 4 and the end of the streaming of Block 3. The publishing module 30, therefore, moves the streaming start time of Block 3 0.5 seconds, to start at time to 2.7 seconds. In this way, the data in Block 3 is calculated to be fully available for the projector module 60 at time 3.5 seconds, allowing the streaming of Block 4 to commence in time. The start times of all the blocks are calculated recursively according to this method until the first block is allocated a transmission time.

Figure 17:
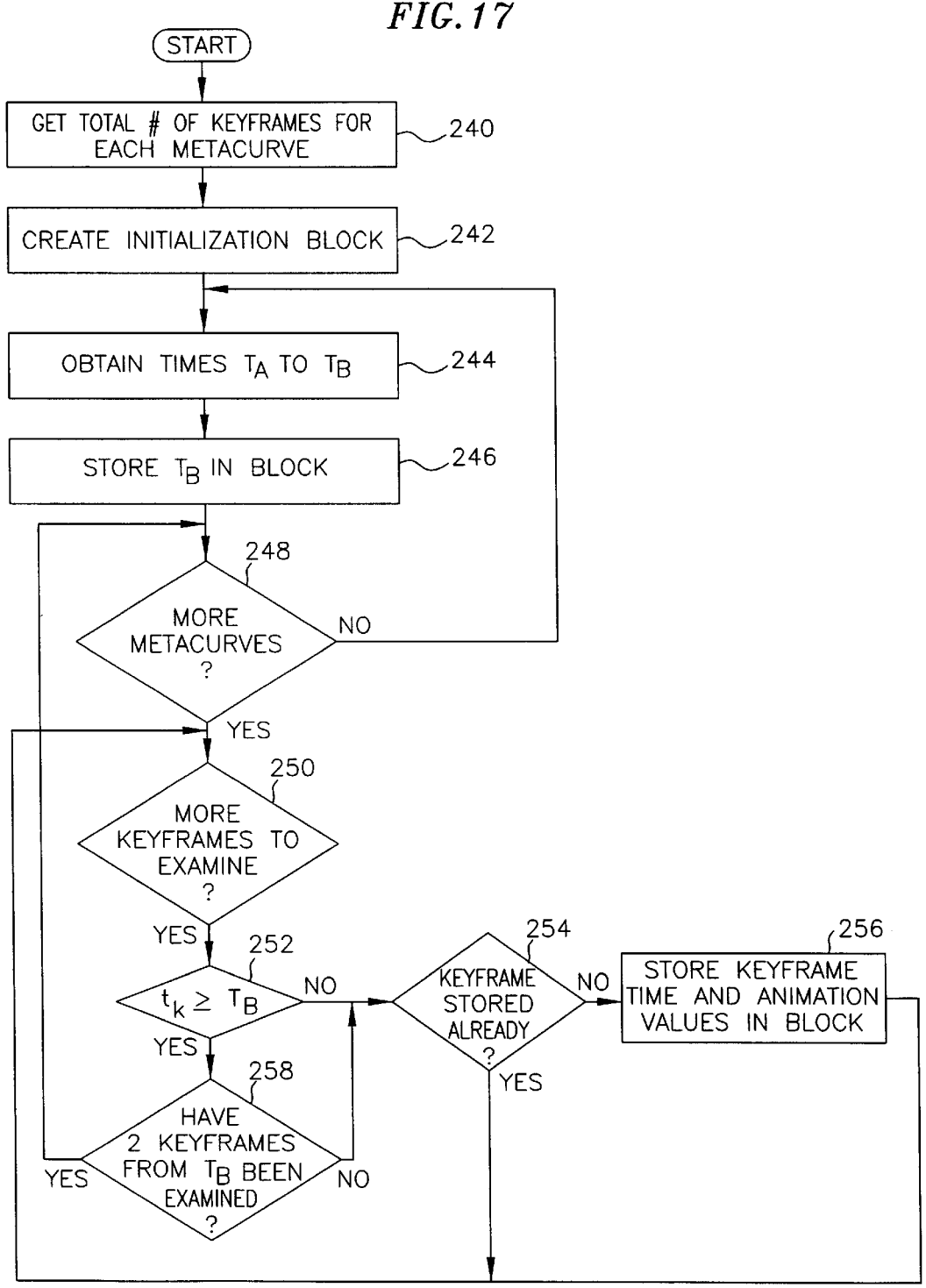
FIG. 17 is a flow diagram of a software program for creating animation data block for streaming over the Internet.

FIG. 17 is a flow diagram of a software program for creating animation data blocks to be streamed over the Internet. Each data block includes the animation data required for the running of an animation sequence from time Ta to time Tb, from time Tb to time Tc, from time Tc to time Td, and so on. As described above, the data block is placed on the stream so that it is available to the projector module 60 before the start time of each animation sequence.

A data block for time Ta to time Tb includes the keyframes of each of the metacurves from time Ta to time Tb. Each data block also includes, for each of the metacurves, two additional keyframes after time Tb. The hermite and spherical quadratic interpolations performed for position/scaling and rotation animations, respectively, require that the projector module 60 know two keyframes before time Ta and two keyframes after time Tb to properly interpolate the animation sequence from time Ta to time Tb. Because the two keyframes prior to time Ta will already have been loaded by the projector module 60 as part of a prior block, the data block for time Ta to time Tb just needs to include the two keyframes after time Tb.

Thus, the software program, in step 240, computes the total number of keyframes for each metacurve (position/scale and rotation) that is associated with each node. In step 242, the program creates an initialization block which is downloaded by the projector module 60 before the movie starts playing. The initialization block includes the total number of keyframes for each metacurve, and further includes the first two keyframes for each of the metacurves.

The program, in step 244, also retrieves a time range Ta and Tb for which animation data is to be stored as a streamable data block. Thus, the data blocks created correspond to contiguous time periods. Time Ta is assumed to be 1+time Tb of a previous block. For the first data block, time Ta is equal to zero.

The publishing module 30 selects a time Tb based on the amount of animation data present from time Ta to a selected time Tb. Generally speaking, animation data for a movie is not uniformly spread over time. Thus, there may be periods of time with a lot of animation data, and periods of time with little animation data. According to one embodiment of the invention, the publishing module 30 examines different Tb values and selects a Tb value that would result in a data block with about 30 to 60 bytes of animation data. The selected time value is transmitted to the program, and the program, in step 246, stores that time Tb value into the data block.

After a suitable time Tb has been selected, the program proceeds to create an animation data block with animation data for each of the metacurves to be streamed for the time period Ta to Tb. In this regard, the program inquires in step 248 whether there are any more metacurves to be examined. If the answer is YES, the program, in step 250, inquires if the metacurve has any more keyframes to be examined. If the answer is again in the affirmative, the program, in step 252, inquires if the time value of that next keyframe to be processed equals or exceeds time Tb. If the answer is NO, time Tb has not been reached yet, the program proceeds to step 254, where it inquires if the keyframe information has already been stored as part of a previous data block. If the answer is NO, the program, in step 256, stores the keyframe time and animation values into the data block.

Referring back to step 252, if the time value of the retrieved keyframe equals or exceeds Tb, the program tests in step 258 if two keyframes starting from time Tb have already been examined to be included into the data block. If the answer is NO, the program proceeds to steps 254 and 256 where the keyframe time and animation values are stored if not already stored in a previous data block.

After two keyframes starting from time Tb have been examined, the program proceeds to step 248 where it examines the next metacurve to be included into the block.

Thus, the process illustrated in FIG. 17 makes it possible to save from having to tell, for each new data block, how many keys are stored into each metacurve. This results in a significant saving of overhead space, particularly when the block does not contain too many keys. At reconstruction time, the projector module 60 first loads the value of Tb, and can thus determine for each metacurve if any keys over time Tb have already been loaded from a previous data block. If, for example, two keys were already loaded for a given metacurve (with a time value higher than Tb), then the projector module 60 reaches the conclusion that no keys are to be expected for that metacurve, and therefore, the rest of the data in the block necessarily relates to the next metacurve or other metacurves following it.

Figure 18:
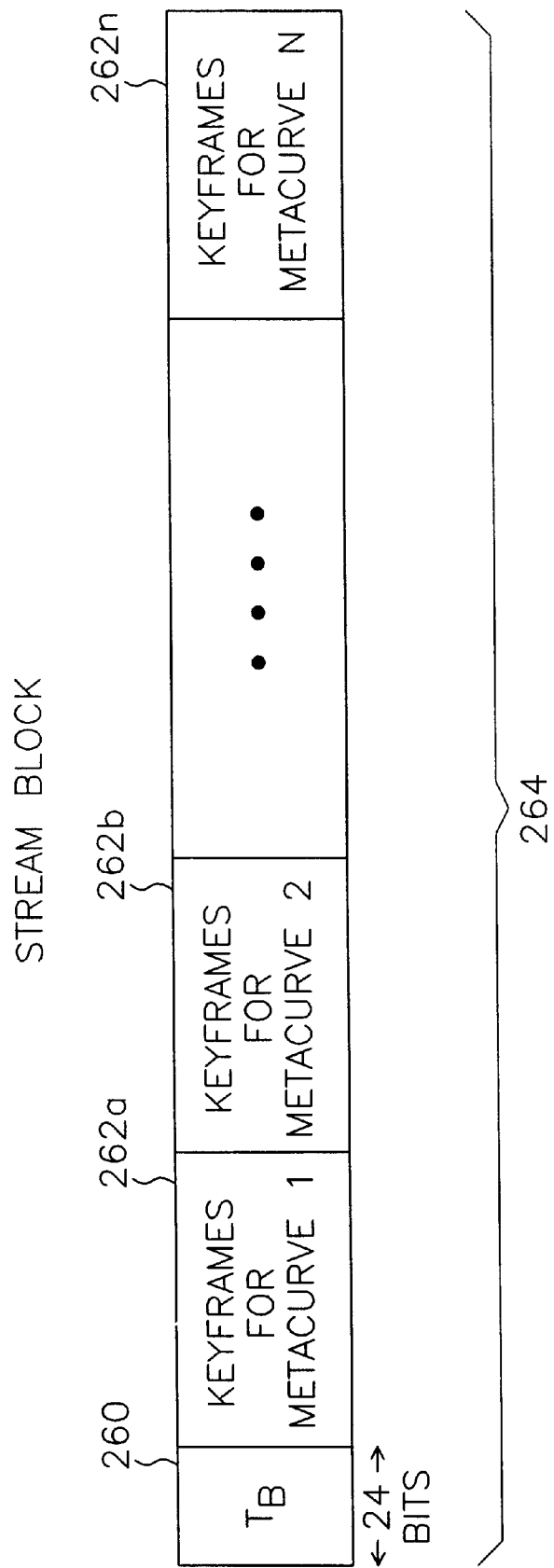
FIG. 18 is a schematic layout diagram of a data block created by the software program of FIG. 17.

FIG. 18 is a schematic layout diagram of a data block 264 created by the program of FIG. 17. The data block 264 includes 24 bits of data for the time value Tb 260. Following the time value Tb 260, the data block 264 includes data for the first metacurve 262a, data for the second metacurve 262b, and so on, until the last metacurve 262n and has been reached. The data for each metacurve 262 includes the time and animation values of each keyframe which will allow the running of animation from time Ta to time Tb. Generally, such keyframes include keyframes within time Ta and time Tb, plus two keyframes after time Tb.

According to one embodiment of the invention, the blocks are assigned a priority based on the type of data that they contain. For instance sound data is assigned a priority of one (highest priority), animation data is assigned a priority of two, lip-synch data is assigned a priority of three, scene message data is assigned a priority of four, and scene pre-load data is assigned a priority of five. Thus, the allocation of a block in the stream depends on both the calculated streaming start time and the priority order.

If a stream file of the size computed with the above formula is not large enough to fit all the blocks of data to be streamed for the scene, the remaining blocks are taken off the stream and placed in the upfront file which is downloaded first prior to the playing of the movie.

After the publishing module 30 has created the upfront and stream files for the movie, they are stored in the second mass storage device 38 (FIG. 1) within the second server 40. A user may decide to do an Internet build for various bandwidths for different types of target platforms. At runtime, the projector module 60 detects the bandwidth for the host computer 55 and streams the files that have been built with the appropriate bandwidth.

In delivering a movie over the Internet, the projector module 60 first downloads the upfront file from the second mass storage device 38 and stores it into the host computer's 55 cache. Once the upfront file has been downloaded, the projector module 60 may then start to play the movie.

Animation and sound data is streamed in the stream files during the playback of the movie. In doing so, the projector module identifies a file for a particular scene as a stream file by examining the file's type code 232c from the header 232 of the upfront file.

The animation and sound data for a particular scene starts streaming before the scene starts, and finishes streaming before the scene ends. As soon as all the data for the current scene has finished loading and while the current scene is still playing, the projector module 60 starts streaming each possible scene that could be played next until the user's interaction with the movie determines the scene to play next. For instance, the user may be presented with the choice to have an actor of the movie investigate a screaming sound or just ignore and proceed with what the actor was doing. The user's decision determines what scene is to be played next. Until the user's decision, either scene is a possible alternative. Thus, the projector module 60 starts streaming both scenes until it receives the user decision. Once the user decision is received, the projector module 60 aborts the streaming of the scene that has not been selected, and continues with the streaming of the scene that has been selected to play next.

Once the projector module 60 has loaded a particular file that has been delivered over the Internet, it stores the file into the host computer's local directory. In this way, if the user decides to see a movie that he or she has seen before, some of the necessary files may be obtained from the local directory instead of re-delivering them via the Internet.

In determining whether to download an upfront file or a stream file, the projector module 60 first checks the local directory to determine if the file has previously been downloaded. If the file has previously been downloaded, the projector module 60 examines the size for the file in the local directory with the size stored for the file in the second mass storage device 38. If there is a discrepancy in the size values, the file is downloaded from the second mass storage device 38. The file in the local directory is then replaced with the downloaded file. In this way, the projector module 60 plays the most updated version of the movie.

E. REAL-TIME SCALABILITY OF 3D GRAPHICS BASED ON INTERNET BANDWIDTH AND CPU SPEED

As described above in conjunction with FIGS. 15A–15C, a user may specify a bandwidth 224 when doing an Internet build. If the user does not know the bandwidth that will be used to deliver the movie, the user performs several Internet builds specifying several different bandwidths. Consequently, different upfront files and streaming files are created based on each of the selected bandwidths.

During movie installation onto the host computer 55, the projector module 60 selects an appropriate Internet build to download based on the bandwidth detected for the host computer 55 from previous downloads or from the download and installation of the projector module 60 itself. If data from previous downloads is not available, a low default value is used. Based upon the detected download speed, the projector module 60 selects the proper streaming files to stream.

As is also described above in conjunction with FIGS. 15A–15C, the user may also specify various scalability factors 214 when doing either a CD or an Internet build. Such scalability factors indicate, among other things, the CPU speed of the target platform. If the user has selected all of the scalability factors in doing the build, all of the objects tagged with different scalability tags are available to the projector module 60. At runtime, the projector module 60 selects the objects with the appropriate scalability tags.

For example, if the movie is distributed via a CD with a CD build file including all of the objects created for the movie, the projector module 60 scales the 3D graphics based on the detected CPU speed. If the host computer 55 includes a Pentium 166 processor, the projector module 60 selects the objects tagged with a Base PC tag 200c. If the same CD is played on a host computer 55 with a Pentium II processor, the graphics displayed scales to the higher CPU speed and includes additional graphics and/or higher resolution objects tagged with a PII/266 tag 200d.

Normally, the runtime engine will load and play data tagged with scalability flags that reasonably match the host computer's configuration. However, when doing an Internet build, extra sets of scalability data may be culled out to reduce the size of the download. For example a low bandwidth Internet build might only include data tagged as Base PC and Software rendering. At playback time the projector module 60 detects, from extra header information in the build, that the build only includes a limited set of scalability data, and allows playback of this data even though it may not match the current machine configuration.

F. DYNAMIC REPLACEMENT OF 3D OBJECTS IN A 3D OBJECT LIBRARY.

The system's library structure as described above in conjunction with FIGS. 2–4 allows a 3D object to be defined as a library object and its geometry information be stored outside a scene. During the playing of a scene, the projector module 30 examines each node's name and inquires if the name corresponds to a root-node listed in the scene's 3DS file. If the answer is YES, the node belongs to a library object. The projector module 30 then retrieves the corresponding master library object file and compares the nodes following the root-node in the scene for a match in the master library object file. If a match is found, the geometry data in the master library object file is used for that node. Accordingly, updates to a 3D object may be made by changing the object's geometry in the library file instead of making the change in each scene in which the object appears.

According to one embodiment of the invention, the 3D movie incorporates commercial products that are replaced and updated based on the sponsorship available for the product. For instance, the Coca-Cola company may pay advertisement fees to have one of its products displayed in one or more scenes of the movie. If, after inserting the Coca-Cola product into the scenes, the Coca-Cola product is to be replaced with a Pepsi-Cola product, the geometry data for the object is changed in the master library object file without having to manually make the changes in each scene that the object appears. Thus, changes to the movie based on sponsorship changes may be efficiently reflected through the system's library substitution method.

The present library substitution method, in conjunction with the system's method of file organization for Internet streaming, also facilitates the transmission of updated versions of movies over the Internet. As described above in conjunction with FIGS. 16–18, the publishing module 30 packages data to be delivered over the Internet into the upfront file and one or more streaming files. The geometry information associated with a 3D object is stored in the upfront file. Thus, if a change to a 3D object's geometry is made in a movie that has already been downloaded by the projector module 60, the projector module 60 needs not to download the entire movie again. Instead, the projector module 60 just downloads the upfront file with the new geometry information. As described above, the projector module 60 detects a change in the downloaded upfront file by checking the file's checksum number.

G. CONTROLLING 3D OBJECT GESTURES

The present system's library structure as described above in conjunction with FIGS. 2–4 also allows gesture animations to be defined within a master library object file. The gesture animations are overlaid on top of a scene's animation when triggered within the scene.

Figure 19:
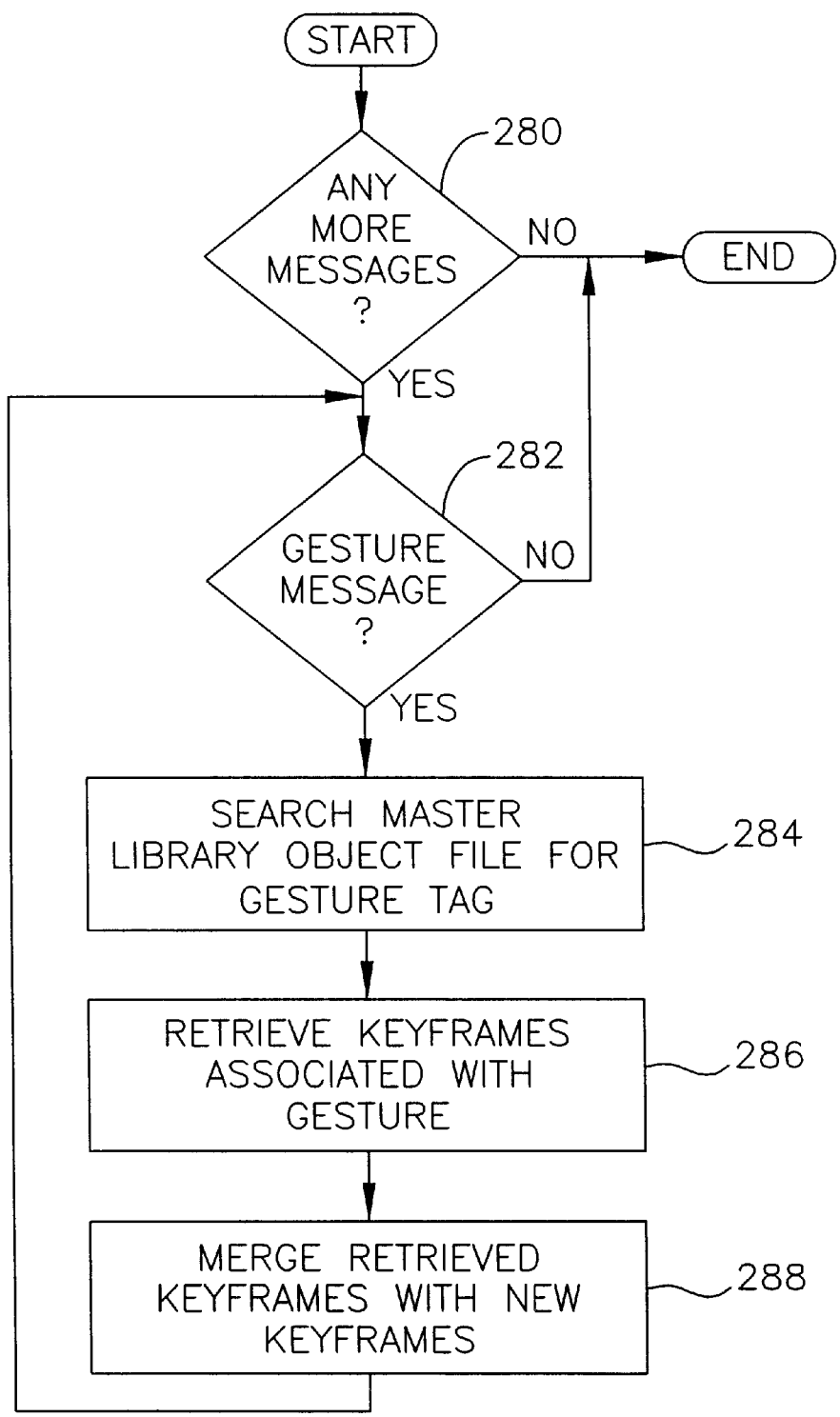
FIG. 19 is a flow diagram of a software program for processing gesture animations for a scene of a multipath movie.

FIG. 19 is a flow process diagram of a software program for processing gesture animations for a scene. The program starts, and in step 280, inquires if there are any more messages to process in the scene's message file. If the answer is YES, the program asks in step 282 if the message is a gesture message. If the answer is again YES, the program, in step 284, searches the corresponding master library object file for the gesture tag corresponding to the gesture.

In step 286, the program retrieves the keyframes associated with the gesture from the actor's S3D file, and in step 288, merges the retrieved keyframes with the keyframes created for the scene in the scene's S3D file.

One type of gesture used in the system are lip-synch gestures. FIG. 20 is a flow diagram of a software program for creating audio and lip animation data for an actor for lip-synching purposes. The program starts, and in step 300, it records generic phonemes for an actor. In step 302, the program stores the phonemes into the sound subdirectory 207 of the project directory 205(FIG. 5). In step 304, the animator uses 3D Studio MAX to create lip gestures to match the recorded phonemes.

Once the phonemes and corresponding lip gestures have been created for the actor, the program, in step 306, records a narration for the actor according to the movie script. The audio recording is also stored in the sound subdirectory 207 as an audio file with a ".wav" extension. In step 308, the program performs a lip-synch analysis of the audio file according to conventional methods described, for instance, in Juang et. al., *Fundamentals of Speech Recognition* (Prentice Hall 1993), which is incorporated herein by reference. The program further creates a series of lip-synch messages for the actor with gesture tags that correspond to the phonemes in the audio file. The lip-synch gesture messages are stored in the sound subdirectory 207 as a lip-synch file with a ".sync" extension. The lip-synch gestures in the lip-synch file are triggered at run-time and overlaid on top of a current scene's animation.

What is claimed is:

1. A method for scaling 3D graphics of a 3D animated content based on characteristics of a particular target machine playing the 3D animated content, the animated content including a 3D object tagged with a scalability tag identifying a particular type of machine in which the 3D object is suitable for display, the method comprising:

tagging a first 3D object associated with a first CPU power with a first scalability tag;

tagging a second 'D object associated with a second CPU power with a second scalability tag;

storing in a data store the first 3D object and the second 3D object;

detecting the CPU power of a target machine;

searching the data store for a 3D object having a scalability tag associated with the detected CPU power;

selecting either the first 3D object or the second 3D object based on the detected CPU power; and displaying the selected 3D object on the target machine.

2. The method of claim 1, wherein the first 3D object identifies a discrete piece of 3D geometry that is of a different resolution than the second 3D object.

3. The method of claim 1 further comprising downloading the selected 3D object over an Internet connection.

4. A method for scaling 3D graphics of a 3D animated content based on characteristics of a particular target machine playing the 3D animated content, the animated content including a 3D object tagged with a scalability tag identifying a particular type of machine in which the 3D object is suitable for display, the method comprising:

tagging a first 3D object associated with a first data rate with a first scalability tag;

tagging a second 3D object associated with a second data rate with a second scalability tag;

storing in a data store the first 3D object and the second 3D object;

detecting a data rate for downloading the 3D animated content to a remote target machine over a computer network;

searching the data store for a 3D object having a scalability tag associated with the detected data rate selecting either the first 3D object or the second 3D object based on the detected data rate; and downloading the selected 3D object over the computer network.

5. The method of claim 4 further comprising displaying the selected 3D object on the target machine.

6. The method of claim 4, wherein the selected 3D object is tagged with a scalability tag identifying the detected data rate.

7. The method of claim 4, wherein the selected 3D object is tagged with a scalability tag identifying a CPU speed associated with the detected data rate.

8. A system for scaling 3D graphics of a 3D animated content based on characteristics of a particular target machine playing the 3D animated content, the animated content including a 3D object tagged with a scalability tag identifying a particular type of machine in which the 3D object is suitable for display, the system comprising:

means for tagging a first 3D object associated with a first CPU power with a first scalability tag;

means for tagging a second 3D object associated with a second CPU power with a second scalability tag;

a data store storing the first 3D object and the second 3D object;

means for detecting the CPU power of the target machine;

means for searching the data store for a 3D object having a scalability tag associated with the detected CPU power;

means for selecting either the first 3D object or the second 3D object based on the detected CPU power; and means for displaying the selected version of the node on the target machine.

9. The system of claim 8, wherein the first 3D object identifies a discrete piece of 3D geometry that is of a different resolution than the second 3D object.

10. The system of claim 8 further comprising means for downloading the selected 3D object over an Internet connection.

11. A system for scaling 3D graphics of a 3D animated content based on characteristics of a particular target machine playing the 3D animated content, the animated content including a 3D object tagged with a scalability tag identifying a particular type of machine in which the version is suitable for display, the system comprising:

means for tagging a first 3D object associated with a first data rate with a first scalability tag;

means for tagging a second 3D object associated with a second data rate with a second scalability tag;

a data store storing the first 3D object and the second 3D object;

means for detecting a data rate for downloading the 3D animated content to a remote target machine over a computer network;

means for searching the data store for a 3D object having a scalability tag associated with the detected data rate;

means for selecting either the first 3D object or the second 3D object based on the detected data rate; and means for downloading the selected 3D object over the computer network.

12. The system of claim 11 further comprising means for displaying the selected 3D object on the target machine.

13. The system of claim 11, wherein the selected 3D object is tagged with a scalability tag identifying the detected data rate.

14. The system of claim 11, wherein the selected 3D object is tagged with a scalability tag identifying a CPU speed associated with the detected data rate.

15. A system for scaling 3D graphics of a 3D animated content based on characteristics of a particular target machine playing the 3D animated content, the animated content including a 3D object tagged with a scalability tag identifying a particular type of machine in which the version is suitable for display, the system comprising:

a mass storage device for storing a first 3D object and a second 3D object, the first 3D object being associated with a first CPU power and tagged with a first scalability tag and the second 3D object being associated with a second CPU power and tagged with a second scalability tag; and a projector module in communication with the mass storage device including logic for:

detecting the CPU power of the target machine;

searching the mass storage device for a 3D object having a scalability tag associated with the detected CPU power;

selecting either the first 3D object or the second 3D object based on the detected CPU power; and displaying the selected 3D object on the target machine.

16. The system of claim 15, wherein the first 3D object identifies a discrete piece of 3D geometry that is of a different resolution than the second 3D object.

17. The system of claim 15 further comprising an Internet connection for downloading the selected version of the node.

18. The system of claim 17 wherein the projector module further includes logic for:

detecting a data rate for downloading the 3D animated content;

searching the mass storage device for a 3D object having a scalability tag associated with the detected data rate;

selecting either the first 3D object or the second 3D object based on the detected data rate; and downloading the selected AD object over the Internet connection.

19. The system of claim 15, wherein the selected 3D object is tagged with a scalability tag identifying the detected data rate.

20. The system of claim 15, wherein the selected 3D object is tagged with a scalability tag identifying a CPU speed associated with the detected data rate.

21. A method for providing 3D content to a target device, the method comprising:

tagging a first 3D object associated with a first attribute with a first tag identifier;

tagging a second 3D object associated with a second attribute with a second tag identifier;

storing in a data store the first 3D object and the second 3D object;

detecting an attribute associated with a target device;

searching the data store for a 3D object having a tag identifier associated with the detected attribute;

selecting either the first 3D object or the second 3D object based on the detected attribute;

downloading the selected 3D object from the data store; and displaying the downloaded 3D object on the target device.

22. A system for providing 3D content to a target device, the system comprising:

a data store storing a first 3D object and a second 3D object, the first 3D object being associated with a first attribute and tagged with a first tag identifier and the second 3D object being associated with a second attribute and tagged with a second tag identifier; and a target device coupled to the data store, the target device being configured for:

detecting an attribute associated with a target device;

searching the data store for a 3D object having a tag identifier associated with the detected attribute;

selecting either the first 3D object or the second 3D object based on the detected attribute;

downloading the selected 3D object from the data store; and displaying the downloaded 3D object on the target device.

* * * * *